(12) United States Patent
Tanaka

(10) Patent No.: US 7,341,323 B2
(45) Date of Patent: Mar. 11, 2008

(54) PRINTING CONTROL DEVICE, PRINTING CONTROL METHOD, AND PRINTING CONTROL PROGRAM RECORDING MEDIUM

(75) Inventor: Kentaro Tanaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 425 days.

(21) Appl. No.: 11/058,158

(22) Filed: Feb. 14, 2005

(65) Prior Publication Data

US 2005/0195233 A1  Sep. 8, 2005

(30) Foreign Application Priority Data

Feb. 13, 2004 (JP) ............................. 2004-035947
Mar. 23, 2004 (JP) ............................. 2004-085492

(51) Int. Cl.
*B41J 2/205* (2006.01)
(52) U.S. Cl. ......................................... 347/15; 347/43
(58) Field of Classification Search .................. 347/15, 347/19, 43, 116; 358/3.09
See application file for complete search history.

(56) References Cited

U.S. PATENT DOCUMENTS 6,671,067 B1 * 12/2003 Adam et al. ................. 358/1.6
6,906,825 B1 * 6/2005 Nakahara et al. ............ 358/1.9

FOREIGN PATENT DOCUMENTS

JP    10-278360     10/1998
JP    2003-182120   7/2003

OTHER PUBLICATIONS

Abstract of Japanese Patent Publication No. 10-278360, Pub. Date: Oct. 20, 1998, Patent Abstracts of Japan.
Abstract of Japanese Patent Publication No. 2003-182120, Pub. Date: Jul. 3, 2003, Patent Abstracts of Japan.

* cited by examiner

*Primary Examiner*—Thinh Nguyen
(74) *Attorney, Agent, or Firm*—Martine Penilla & Gencarella, LLP

(57) ABSTRACT

An ID (error information) 31a expressing the results of comparing calorimetric data obtained by measuring in the color space Lab (the specified color space) the color of each patch for correcting color (standard image) P3 of the standard dot recording rate (ink recording amount) printed by a printer (printing device) 20 on printing paper (printing medium) is acquired and the acquired ID 31a is used to correct dot amount data (printing data) expressing the image and to make dot amount data for compensating color drifts in image for printing printed by a printer 20 out of the dot amount data. The corrected dot amount data are used to control the printer 20 to print an image for printing corresponding thereto.

18 Claims, 26 Drawing Sheets

FIG. 15

Dot distribution table 14d (the case of C)

| Input gradation values | Output gradation values | | | | | | | | |
|---|---|---|---|---|---|---|---|---|---|
| | S1 | M1 | L1 | S2 | M2 | L2 | S3 | M3 | L3 |
| 0 ⋮ 255 | 0 ⋮ Ai ⋮ 0 | 0 ⋮ 0 | 0 ⋮ 255 | 0 ⋮ 0 | 0 ⋮ 0 | 0 ⋮ 255 | 0 ⋮ 0 | 0 ⋮ 0 | 0 ⋮ 255 |

$\underbrace{\qquad}_{D11}$ $\underbrace{\qquad}_{D12}$ $\underbrace{\qquad}_{D13}$

⇩

After correction

| Input gradation values | Output gradation values | | | | | | | | |
|---|---|---|---|---|---|---|---|---|---|
| | S1 | M1 | L1 | S2 | M2 | L2 | S3 | M3 | L3 |
| 0 ⋮ 255 | 0 ⋮ ACi ⋮ 0 | 0 ⋮ 0 | 0 ⋮ 0 | 0 ⋮ 0 | 0 ⋮ 0 | 0 ⋮ | 0 ⋮ 0 | 0 ⋮ 0 | 0 ⋮ |

FIG. 17

Standard recording rate table D21

(Case of Y set mode 1)

Small ←── Ink amount of dot ──→ Large

| Type of dot | Small dot 1 | Medium dot 1 | Large dot 1 |
|---|---|---|---|
| Standard dot recording rate | 90% | 50% | 30% |

Large ←─────────→ Small
Dot recording amount

FIG. 21

$$
\begin{array}{c|ccc}
 & \multicolumn{3}{c}{\text{Dot} \quad 122} \\
 & B & M & S \\
\hline
C & +10 & -10 & +5 \\
M & +8 & +7 & +5 \\
Y & -10 & +3 & -5 \\
K & -20 & -10 & -5 \\
\end{array}
$$

Ink color

Approximately same color value          147s

| Nozzle class | Number of small dots | | | |
|---|---|---|---|---|
| +20 | 0 | 30 | 60 | 241 |
| +10 | 0 | 31 | 62 | 248 |
| 0 | 0 | 32 | 64 | 255 |
| -10 | 0 | 33 | 66 | 255 |
| -20 | 0 | 34 | 68 | 255 |

FIG. 23

Approximately same color value          147m

| Nozzle class | Number of medium dots |
|---|---|
| +20 | 0--28--58 ---------- 239 |
| +10 | 0--30--61 ---------- 247 |
| 0 | 0--32--64 ---------- 255 |
| -10 | 0--34--67 ---------- 255 |
| -20 | 0--36--70 ---------- 255 |

FIG. 24

Approximately same color value

147b

| Nozzle class | Number of large dots |
|---|---|
| +20 | 0--24--54 ------------------ 235 |
| +10 | 0--28--59 ------------------ 245 |
| 0 | 0--32--64 ------------------ 255 |
| −10 | 0--36--69 ------------------ 255 |
| −20 | 0--40--74 ------------------ 255 |

PRINTING CONTROL DEVICE, PRINTING CONTROL METHOD, AND PRINTING CONTROL PROGRAM RECORDING MEDIUM

BACKGROUND OF INVENTION

1. Field of the Invention

The present invention relates to a printing control device, a printing control method, and a medium for recording a printing control program for controlling the printing of image corresponding to printing data by using a printing head of the printing device.

2. Description of the Related Art

Ink jet printers that had been mass produced in the past included an array of printing nozzles for each color (type) of ink and a nonvolatile semiconductor memory to record ID (error information) for compensating drifts in the weight of ink discharged from each array of printing nozzles. Before proceeding to a printing control for each printer, color correcting data such as LUT (look-up table) for calibration adapted to the ID are prepared and stored in advance, and any error in the weight of ink is compensated so that the weight of ink discharged from the printing head may conform to the standard printer (the standard equipment) by referring color correcting data corresponding to the ID. (see, for example, Japanese Unexamined Patent Publication Hei 10 (1998)-278360).

At production factories of printers, the weight of a specified number of drops of ink discharged from a printer head not yet incorporated into the printer is measured, and the difference with the weight of ink from the standard printer is correlated with ID and is recorded in a nonvolatile semiconductor memory to proceed to a calibration operation.

The work of measuring the weight of ink discharged from a printing head is time consuming to some extent. However, speedy implementation of calibration operation was desired in order to reduce costs in the mass production of printers. In addition, due to delicate variations in the voltage applied to each printing head when it is incorporated into a printer, there developed delicate errors in the color of image printed on the printing medium.

SUMMARY OF THE INVENTION

The present invention was made in view of the issues described above, and its object is to acquire a good color reproductiveness for the image to be printed.

Another object of the present invention is to acquire colored dots.

In order to achieve the above object, the present invention is a printing control device for carrying out a printing control on a printing device for printing a image to be printed corresponding to printing data on a printing medium by means of a printing head that adheres ink on the printing medium, and includes an error acquiring unit and a printing controlling unit.

The error acquiring unit acquires error information, which expresses a result of comparing a calorimetric data obtained by measuring a color of a standard image of a standard recording amount in the ink mentioned above printed by the printing device on the printing medium in a specified color space and a reference calorimetric data. The use of this error information enables to correct the printing data expressing image in the printing control unit to be printing data for compensating a color drift of the image for printing to be printed by the printing device and to control the printing device to print image to be printed corresponding to the corrected printed data. Then, the printing device adheres ink on the printing medium through the printing head to print on the printing medium printed image with compensated a color drift.

As the error information expressing the result of comparing the calorimetric data of standard image actually printed on the printing medium by the objective printing device of printing control and the reference calorimetric data serves as the basis of compensating a color drift of the printing device, there is no delicate error in the color of the printed image due to delicate variation in voltage applied to the printing head and the like. Therefore, it will be possible to improve the color reproductiveness of the printed image in relation to the reference color than in the past when only the weight of ink was compensated.

The amount of ink recording data may be an amount of dots for recording expressed by the number of ink dots formed by a unit area on the printing medium, may be a dot recording ratio expressed by the ratio of number of ink dots, may be an ink recording density expressed by the number of the ink dots formed for a unit area on the printing medium converted into a specified type of dot such as large dot when a printing device on which a plurality of types of dots can be formed, or may be an ink recording ratio expressed by the ratio of number of the ink dots.

The standard image may be an image formed by a single type of ink, or an image formed by two or more types of ink. Here, the adoption of a wholly uniform plain image for the standard image will enable to obtain more correct calorimetric data, and to obtain a good color reproductiveness in relation to the reference color for the objective printing device.

The limitation of the standard recording amount to one type is preferable in that it enables the printing device to speed up its calibration operation. However, it is also possible to provide a plurality of stages of standard printing amounts.

The specified color space may be defined as a color space wherein a plurality of color components constitute the quantity of color components. The color space, color components and quantity of color components may be combined in a variety of ways such as the color components $L^*$, $a^*$ and $b^*$ and their respective values in the case of the color space $L^*a^*b^*$ CIE specified by the International Commission of Illumination (CIE), the color components $L^*$, $u^*$ and $v^*$ and their respective values in the case of the color space $L^*u^*v^*$ CIE, the color components X, Y and Z and their respective values in the case of the color space XYZ CIE, the color components R, G and B and their respective values in the case of the RGB color space, and the like. Here, $L^*$ is an element color representing luminosity, and $a^*$, $b^*$, $u^*$, and $v^*$ are element colors representing hue and saturation. Hereinafter, (*) will be omitted when they will be indicated.

Various data can be used for the printing data mentioned above. For example, they may take the form of data expressing image by gradation data for each picture element. The gradation data may be 256 gradations before a half-tone processing, or two gradations after a half-tone processing. The picture element may be of any number as far as an image can be expressed thereby, and a plurality of picture elements may constitute a block. For example, 4×4 picture elements, 8×8 picture elements or any other combinations suitable for expressing a small image may be adopted.

A color drift in the printing device may be defined as one from the reference color. For example, when it is defined as a color drift from the reference printing device (reference equipment) serving as the reference, it will be possible to compensate a color drift more properly. Of course, the reference calorimetric data maybe calorimetric data of the reference color, and also those of colors other than the reference color.

When the printing device is used to print a standard image, if dot amount data are created for printing the standard image from the standard recording amount, and if the dot amount data are used to control the printing device to print the standard image on the printing medium, it will be possible to print standard image by using a part of the process of printing image for printing by using the printing data, and therefore it will be easy to generate error information.

The printing control unit may be configured in such a way that the printing data expressing the image by using the error information may be corrected to be printing data for compensating the errors of the colorimetric data of the standard image printed by the printing device in relation to the reference colorimetric data. Such a configuration, resulting in the compensation of the color drifts in the image to be printed with reference to the condition as they are printed on the printing medium, ensures that the color reproductiveness of the image to be printed would be improved in relation to the reference color.

The error information may be recorded in the printing device so that the error acquiring unit may acquire the error information from the printing device. The integration of the error information with the printing device eliminates the necessity of inputting separate error information due to the acquisition of the error information from the printing device even if the user of the present printing control unit changes the printing device. Therefore, convenience can be improved.

And the printing control unit may specify the relationship of correspondence for color correction between the printing data before the correction and the corrected printing data for correcting the color drifts in the image to be printed based on the error information acquired from the error acquiring unit and may correct the printing data expressing the image mentioned above by the specified relationship of correspondence for the correction of color.

A storage area may be provided for storing a plurality of color correcting data specifying the relationship of correspondence for color correction between the printing data before the correction and the corrected printing data for compensating the color drifts in the image for printing for every plurality of stages of comparison results between the calorimetric data obtained by measuring the color of the standard image in the specified color space and the reference colorimetric data, and the printing control unit may specify the color correcting data corresponding to the error information among a plurality of color correcting data stored in the storage area and correct the printing data by referring the color correcting data. Such simple configuration enables to correct the printing data so that the color drifts in the image to be printed may be compensated and to acquire a good color reproductiveness of the image to be printed in relation to the reference color. Here, color correcting data may take the form of an information table-type color correcting table, data for calculation, LUT for calibration, a conversion formula for calibration, LUT for color conversion (color conversion table) and other various data.

The error information mentioned above may be a piece of information wherein, when the colorimetric data obtained by measuring the standard image in the specified color spaces and the reference calorimetric data are to be compared, the results of comparing only the color component amounts having the maximum variation in relation with the recording amount of ink among a plurality of color component amounts are expressed. The printing control unit may correct the printing data in such a way that the error of the standard image printed by the printing device in the color component amount having the maximum variation with the reference calorimetric data may be compensated.

The fact that the error information shows the results of comparing the color component amounts having the maximum variation with the variation in the amounts of ink among the calorimetric data of the image for selecting color components printed on the printing medium ensures that a good color reproductiveness of the image to be printed will be acquired in relation to the reference color. And for generating error information, it is sufficient to produce error information by using the results of comparing only the color component amounts having the maximum variation with the variation in the recording amount of ink from among a plurality of color component amounts in the color space serving as the reference for the measurement of color, thus it is no longer necessary to make convoluted calculations during the calibration operation of printing devices subjected to printing control. As a result, their calibration operation can be accelerated.

Here, the reference printing device serving as the reference may be used to print the image for selecting color components according to the first recording amount and the second recording amount mutually different by the ink mentioned above on the printing medium, the color of each printed image for selecting color components may be measured in the specified color space to acquire colorimetric data consisting of a plurality of color component amounts for both image for selecting color components, and the difference of color component amounts for both image for selecting color components for each color component in the specified color space may be acquired thereby. When the selective color component amount of the color component having the maximum difference is specified from among the plurality of color component amounts, the information expressing the result of comparing only the selective color component amounts may be chosen as the error information for comparing the calorimetric data acquired by measuring the color of standard image in the specified color space and the reference calorimetric data. The printing control unit may correct the printing data in such a way that errors in the reference calorimetric data in the selective color component amount of the standard image printed by the printing device may be compensated by using the error information. Then such a simple configuration enables to speed up the calibration operation of the printing device and ensures that the image to be printed would have a good color reproductiveness in relation to the reference color.

The difference of color component amounts relating to the image for selecting color components may grow larger in value as the difference between both color component amounts grows larger.

Here, when the combination of the first recording amount and the second recording amount is set at the minimum and the maximum of the varied recording amounts of ink, such a simple configuration enables to acquire a good color reproductiveness of the image to be printed in relation to the reference color.

The ink recording amount having the maximum variation in calorimetric data due to variations in the amount of ink adhering on the printing medium for each printing device for the ink mentioned above may be chosen as the standard recording amount for printing the standard image by the printing device on the printing medium, and the information showing the results of comparing the colorimetric data obtained by measuring the color of standard image printed by the printing device on the printing device and the reference calorimetric data may be chosen as a piece of error information. The printing control unit may correct the printing data in such a way that the error in the calorimetric data of the standard image of the ink recording amount having the maximum variation printed by the printing device in relation with the reference calorimetric data may be compensated.

The error information shows the comparison results of colorimetric data acquired by measuring the color of the standard image of the ink recording amount having the maximum variation due to variations in the amount of ink adhering on the printing medium and ensures that the image for printing would have a good color reproductiveness in relation to the reference color. And the preparation of the error information by using the selective color component amounts of only the standard image having the maximum variation in the recording amount ink enables to speed up the calibration operation of the printing device.

When the first and second printing device with different consumption of ink are used to print a plurality of image for determining recording amount having different recording amount of ink on the printing medium, the color of each image for determining recording amount printed by the first and second printing devices in the specified color space to acquire the first and second calorimetric data for each image for determining the recording amount, and when, in view of the recording amount of ink used to print the same plurality of image for determining the recording amount as the first and second calorimetric data, the ink recording amount having the maximum variation in calorimetric data due to variations in the amount of ink adhering on the printing medium for each printing device has been determined as the standard recording amount, the information showing the result of comparing the colorimetric data acquired by measuring the color of the standard image of the determined ink recording amount in the specified color space and the reference colorimetric data may be chosen as the error information. By using the error information, the printing control unit may correct the printing data in such a way that the error of the calorimetric data of the standard image of the determined ink amount in relation to the reference colorimetric data may be compensated.

As the error information shows the results of comparing the calorimetric data acquired by measuring the color of the standard image of an ink recording amount determined from the colorimetric data of the image for determining recording amount printed on the printing medium, it assures a good color reproductiveness of the image to be printed in relation to the reference color.

If the first and the second printing devices are designed to have the ink adhere on the printing medium at the minimum and the maximum limit of the variation of the ink amount, it will be possible to further improve the color reproductiveness of the image to be printed in relation to the reference color.

The information showing the results of comparing the calorimetric data obtained by measuring the color of the standard image printed by the printing device by the type of dot on the printing medium in the specified color space and the reference colorimetric data by reducing the dot recording amount of the standard image printed by the second dot requiring more ink amount than the first dot by the ink mentioned above to a level lower than the dot recording amount of the standard image printed by the first dot may be chosen as the error information. And the information showing the result of comparing the colorimetric data obtained by measuring the color of the standard image printed by the printing device by the type of dot on the printing medium in the specified color space and the reference calorimetric data by reducing the dot recording amount of printed the standard image as the amount of ink per dot by the ink mentioned above increases may be selected as the error information. By using error information corresponding for each type of dot, the printing control unit may correct the printing data in such a way that the color drift of printing image printed by the printing device may be compensated.

As recording amounts having important variations in colorimetric data due to variation in the amount of ink adhering to the printing medium occurring for each printing device decrease as the amount of ink per dot increases, the configuration mentioned above enables to improve further the color reproductiveness of image to be printed in relation to the reference color.

The printing control unit may be provided with error information for each type of the ink so that printing data may be corrected in such a way that the color drifts in the image to be printed by the printer may be compensated by using the corresponding error information for each type of ink. Then, it will be possible to improve further the color reproductiveness of the image to be printed in relation to the reference color.

And the present invention relates to a printing control device for generating printing data to be supplied to a printing unit in order to print on a printing medium by using the printing unit capable of forming a N number of types (N is an integer of 2 or more) of dots of different sizes in an area of one picture element by discharging selectively a N number of types of ink drops of different ink amounts by using a plurality of types of ink, wherein the printing unit stores error information showing the errors in color value of outputs by errors in the weight of ink for each at least one or more specified type of dot among the N number of types of dots for every plurality of ink color, the printing control device includes an error information receiving unit for receiving the error information from the printing unit, and a dot data generating unit for generating dot data showing the state of the dots formed in each picture element in the image to be printed by processing the given raw image data, and the dot data generating unit is configured in such a way that, according to the error information, the dot data of which the errors in color value may be compensated for every plurality of ink color and every specified types of dots may be generated.

The invention thus configured provides a printing control device for generating printing data to be supplied to the printing unit in order to print on the printing medium by using a printing unit capable of forming a N number (N is an integer of two or more) of types of dots of different sizes in an area of one picture element by discharging selectively a n number of types of ink drops of different ink amounts by using a plurality of ink types.

The printing unit stores error information showing the errors in color value of outputs by errors in the weight of ink for at least each one or more specified type of dot among the n number of types of dots for every plurality of ink color.

The printing control device includes an error information receiving unit and a dot data generating unit. The error information receiving unit receives error information from the printing unit. The dot data generating unit generates dot data showing the state of the dots formed in each picture element in the image to be printed by processing the given raw image data. The dot data generating unit is configured in such a way that, according to the error information, the dot data of which the errors in color value may be compensated for every plurality of ink color and every specified types of dots may be generated. Therefore, it will be possible to acquire dots of the aimed color. In the case of controlling an ink jet-type printing device, it will be possible to compensate variations in the discharge characteristic of each nozzle of the printing device.

In addition, the dot data generating unit may include a color converting unit for generating color converted image data shown in a plurality of color components that can be used by the printing unit by converting the color indication system of the original image data by using a color conversion table, a half-tone unit for converting the gradation value of each color converted image data for each picture element into any one of a N+1 number of gradation values based on the relationship of correspondence between the gradation value of color converting image data to be inputted and the combination of a N number of types of dots and their respective recording ratio to be outputted, a relationship of correspondence already compensated and reflecting the error information, and the half-tone unit may generate a reference relationship of correspondence between the gradation values of color converted image data prepared in advance by assuming that there is no error in color values and the combination of respective recording ratio of a N number of types of dots, and a relationship of correspondence compensated according to the error information. Any attempt to compensate the color drifts in image for printing for each type of dot by correcting color converted image data not grouped together by each type of dot entails complicated processing. However, as it is not necessary to compensate color converted image data, the color drifts in image for printing can be easily compensated.

Also a compensatory dot number recording unit for recording a dot number adjusting the color values of all the error information to a more or less equivalent value may be provided for each error information, and according to the error information and the contents recorded in the compensatory dot number recording unit, the dot data generating unit may generate dot data wherein the errors in color value are compensated for every plurality of ink color and for each specific type of dot. Due to the number of dots recorded therein that levels the color values to the almost same level, it will be possible to compensate easily the color drifts in the image for printing by referring the contents recorded therein.

And the color values may take the form of coordinate values of coordinates in a uniform color space.

In addition, when the distance between points indicating dot color in a uniform color space is the minimum, the color value of each dot may be considered as being the approximately same. Then, due to the availability of printed image close to the reference color, it will be possible to obtain a good color reproductiveness of the printed image.

The printing control device described above includes various modes such as the possibility of being carried out together with other methods as it is incorporated in a certain equipment. For example, it can be applied as a printing system including a printing device. Also, due to the possibility of processing by following the specified procedure adapted to the configuration of the printing control device, the present invention presents actions and effects as a control method similar to those described above. And since the printing control device is often used to execute various control programs, a program, a program product or a computer-readable recording medium recording the program designed to make a computer function as the printing control device mentioned above can acquire the actions and effects similar to those mentioned above.

BRIEF DESCRIPTION OF THE DRAWINGS

FIG. 15 is an illustration schematically showing the structure of a dot distribution table.

FIG. 17 is an illustration showing schematically the structure of the standard recording ratio table in a variant.

FIG. 21 is an illustration showing an example of nozzle classes recorded in the nozzle class recording unit.

FIG. 22 is an illustration showing an example of small dot table.

FIG. 23 is an illustration showing an example of medium dot table.

FIG. 24 is an illustration showing an example of large dot table.

DETAILED DESCRIPTION

Figure 1:
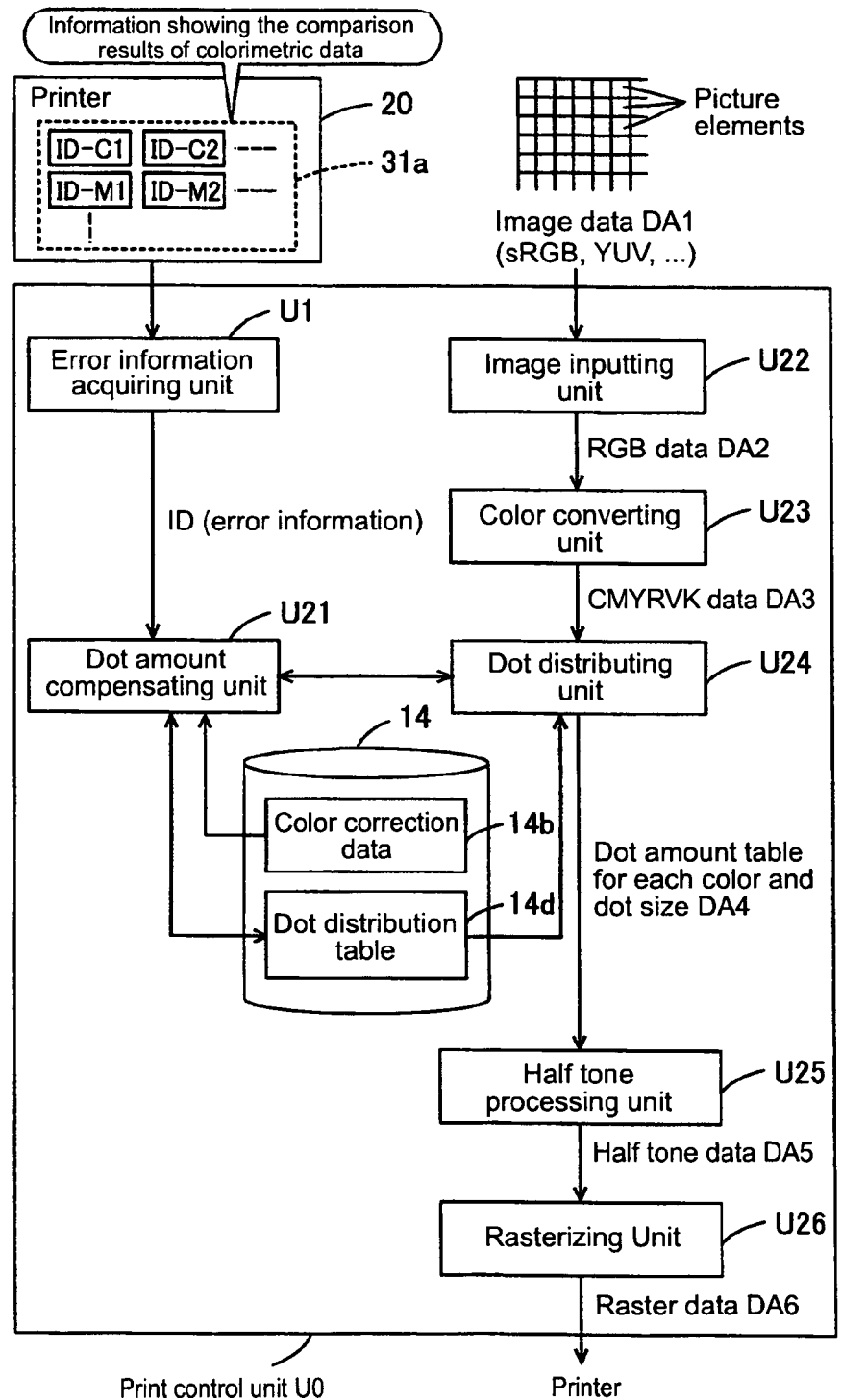
FIG. 1 is a block chart showing schematically the configuration of the printing control system.
Figure 2:
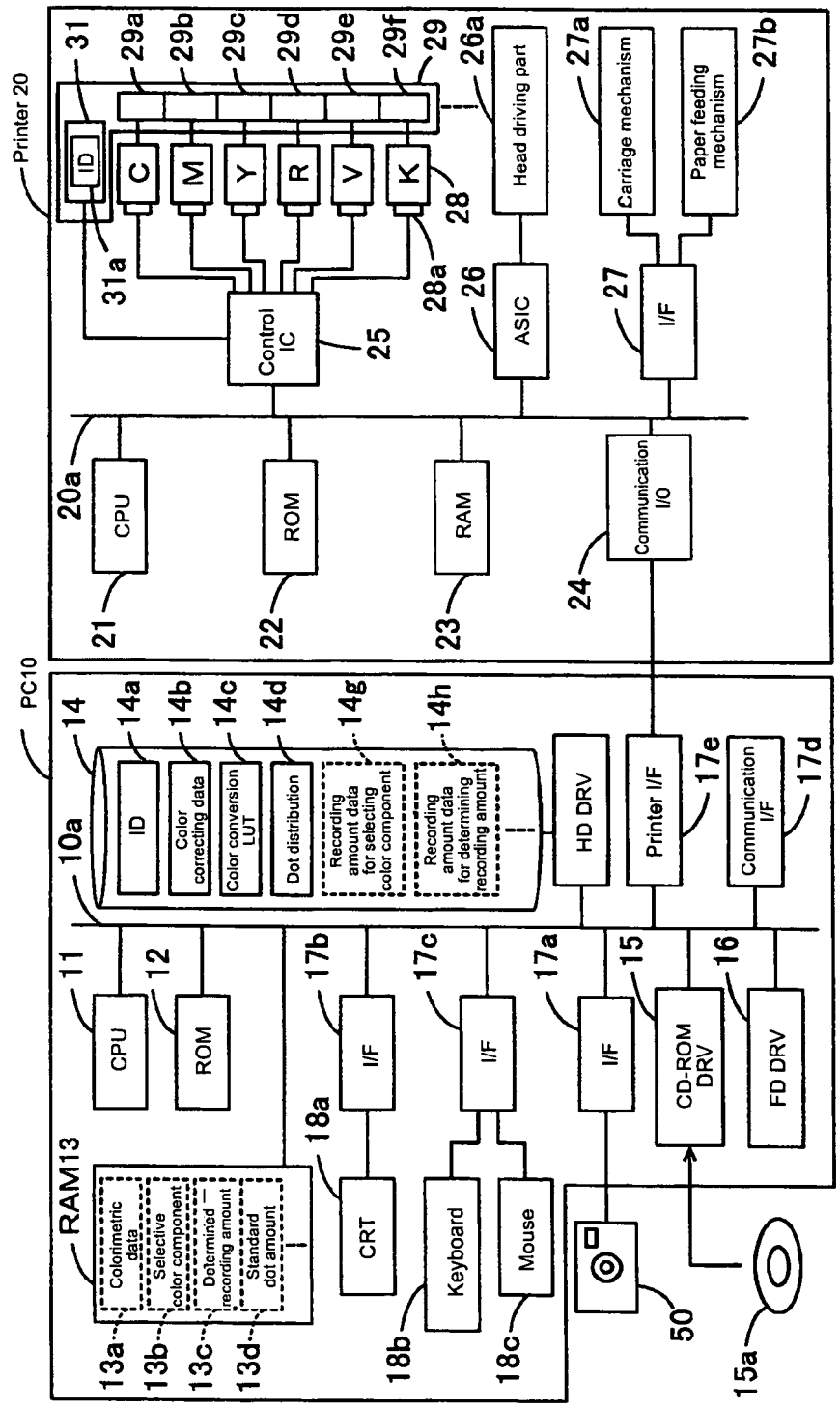
FIG. 2 is a block diagram showing the outline of the color correcting system.
Figure 3:
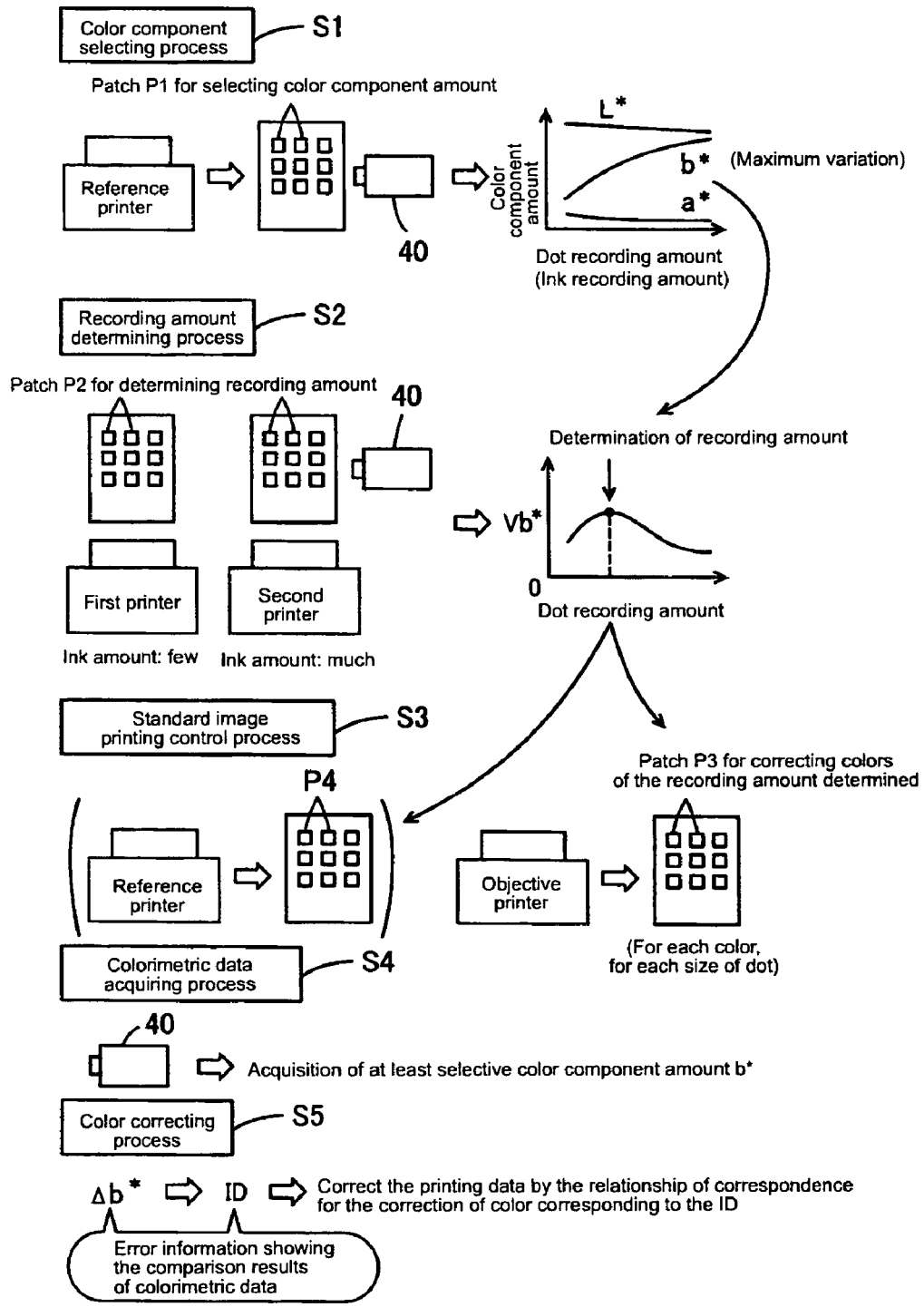
FIG. 3 is an illustration showing schematically a color correcting method.
Figure 4:
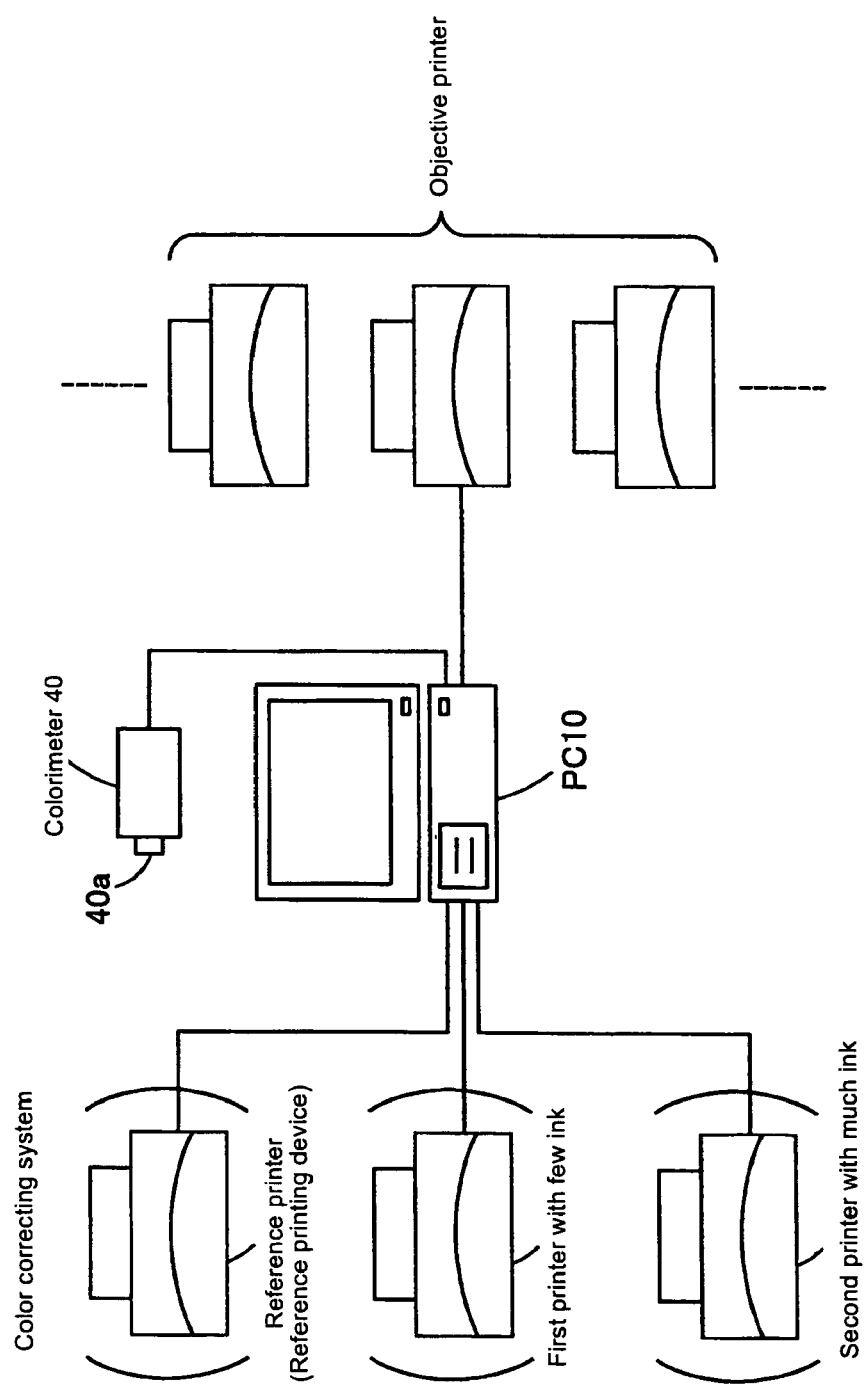
FIG. 4 is a block diagram showing the outline of the color correcting system.

The embodiments of the present invention will be described below according to the following order:
(1) Configuration of the printing system and the color correcting method in the first embodiment
(2) Description of the method of creating error information (3) Printing control process
(4) Variants
(5) Second embodiment (1) Configuration of the Printing System and the Color Correcting Method in the First Embodiment FIGS. 1 is an illustration schematically showing the configuration of a printing control device U0 constituting the first embodiment of the present invention, and FIG. 2 shows a printing system consisting of a personal computer (PC) 10 serving as a color correcting device and a printing control device of the present invention in the present embodiment, an ink jet printer 20 capable of printing colorerving as a printing device (printing unit) and the like. FIG. 3 is an illustration schematically showing a color correcting method. FIG. 4 is a block diagram showing the outline of a color correcting system suitable for carrying out the present color correcting method. It is needless to say that the computer used in the present invention is not limited to a PC.

In the PC 10, a CPU 11 constituting the core of calculation operation controls the whole PC through a system bus 10a. This bus 10a is connected with a non-rewritable semiconductor memory ROM 12, a rewritable semiconductor memory RAM 13, a CD-ROM drive 15, a flexible disk (FD) drive 16, various interfaces (I/F) 17a-e, and the like. It is also connected with a hard disk (HD) 14 which is a magnetic disk through a hard disk drive. As for the printing system including a color correcting device, the RAM 13 stores calorimetric data 13a, data representing specified selective index amount 13b, determined ink recording amount 13c, standard dot amount data 13d, and the like.

The HD 14 stores an operating system (OS), application programs (APL) and the like, which are transferred at the time of execution as required to the RAM 13 for execution by the CPU 11 to be executed. In the case of printing systems including the printing control device of the present invention, the HD 14 is defined as a storage area for storing the printing control program of the present invention, ID 14a obtained from the printer, a plurality of color correcting data 14b as one-dimensional data, a color conversion LUT (color conversion table) 14c, dot distribution table (dot type corresponding data) 14d, and various threshold values and the like. I/F 17a, e.g., USB I/F, is available for use in a digital camera 50, a scanner, and a video camera.

In the case of the printing system including the color correcting device of the present invention, the HD 14 stores the color correcting program of the present invention, recording amount data 14g and 14h, various threshold values and the like. In this case, a calorimeter 40 is connected with the I/F 17a. The calorimeter 40 can obtain a plurality of color components L, a, b based on the Lab table color system according to the CIE (1976) standard as color component amounts (color value) by directing its color detecting unit 40a to the object of measuring color, and can output the color component amount L, a, b obtained to the PC 10. Here, the CIE Lab color space (specified color space) is uniform color space not depending on devices consisting of a plurality of color components L, a, b as their color component amounts. Incidentally, L is a color coordinate representing luminosity (brightness) and a, b are ones representing hue and saturation. Needless to say, the color spaces to be measured may be CIE Luv color space (a kind of aequalis spaces), CIE XYZ color space, RGB color space, and so forth.

CRT I/F 17b is connected with a display 18a for displaying images corresponding to the data based on color image data, the input I/F 17c is connected with a keyboard 18b or a mouse 18c as operating input equipment, and the printer I/F 17e is connected with the printer 20 through for example serial I/F cable. Further, the I/F for a projector provided for the PC may be the I/F for a projector which displays the images corresponding to color image data.

The printer 20 discharges from the printing head six colors of ink filled in six ink cartridges 28 respectively provided for each color of CMYRVK (cyan, magenta, yellow, red, violet, and black) to eject ink on the printing paper (printing medium) so that dots may be formed thereon. In this way, it prints images for printing corresponding to the printing data expressing a color image. Needless to say, a printer using light cyan, light magenta, light black, dark yellow, a colorless ink and the like may be used. And a printer not using ink of any of CMYRVK maybe adopted. And it is also possible to adopt various types of printing devices such as bubble-jet printers wherein bubbles are generated in the ink passage before discharging the ink, a laser printer for printing images for printing on the printing medium by using a toner ink, and the like. The ink used by the printing device may be liquid or solid. Each ink used in the present embodiment is defined as an ink made by mixing an aquatic solvent with a coloring material consisting of a fine pigment. However, it may be an ink made by mixing coloring materials with a stain, or it may be an ink using an oleaginous solvent.

The present printer 20 is connected with the CPU 21, ROM 22, RAM 23, communication I/O 24, control IC 25, ASIC 26, I/F 27 and the like through the bus 20a, and the CPU 21 controls various units according to a program written in the ROM 22.

A carriage running in the main scanning direction in the carriage mechanism 27a is loaded with each of the ink cartridges 28, and a printing head unit (printing head group) 29 is mounted thereon. The unit 29 is equipped with printing heads 29a-f provided for each of six types of ink CMYRVK and a non-volatile semiconductor memory 31. This memory 31 may take form of an EEPROM and the like capable of recording color adjusting ID (error information) 31a and the like used to correct printing data by the PC. Each printing head 29a-f incorporated into the printer can discharge an ink of the color corresponding to adhere on the printing paper, and the printer 20 uses printing heads 29a-f corresponding to each type of ink to form dots on printing paper and to print the images for printing.

Each cartridge 28 is provided respectively with a memory chip 28a consisting of, for example, RAM, and each memory chip 28a is electrically connected with a control IC 25.

The communication I/O 24 is connected with the printer I/F 17e of the PC 10, and the printer 20 receives raster data of each color transmitted from the PC 10 through the communication I/O 24. The ASIC 26 outputs impressed voltage data corresponding to the raster data to the head driving unit 26a while receiving and transmitting specified signals from and to the CPU 21. The head driving unit 26a generates impressed voltage patterns from the impressed voltage data to piezo-elements contained in the printing head 29a-f and causes the printing heads 29a-f to discharge six colors of ink by the dot unit. The carriage mechanism 27a and the paper feeding mechanism 27b connected with the I/F 27 causes the printing head unit 29 to perform the main scanning and the side scanning by turning pages from time to time and feeding successively the printing paper.

The printing heads 29a-f are provided with a plurality of ink jet nozzles for each color and include piezo-elements disposed for each such nozzle.

Figure 5:
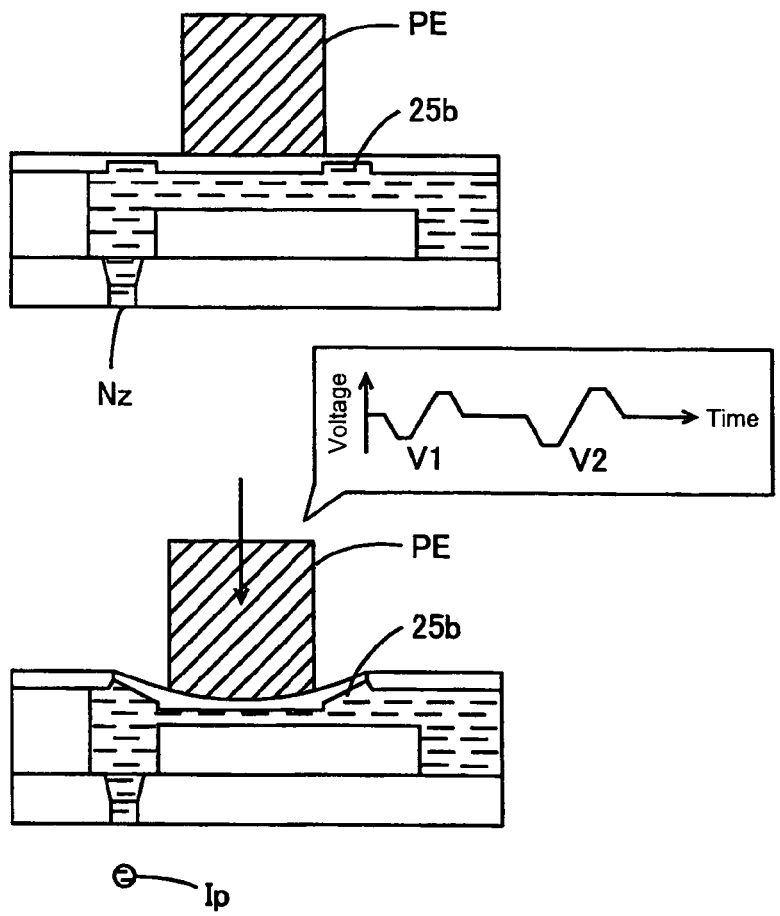
FIG. 5 is an enlarged illustration of the nozzle and its internal structure.

As shown in FIG. 5, the piezo-element PE is fixed at a position adjacent to the ink passage 25b leading ink to the nozzle Nz, and when a voltage of a specified time range is applied between the poles fixed on both ends of the peizo-element PE, it expands during the application of voltage and deforms one side of the ink passage 25b. As a result, the volume of the ink passage 25b contracts in response to the expansion of the peizo-element PE, and ink corresponding to this contraction forms an ink drop Ip and is discharged at a high speed from the top of the nozzle Nz to infiltrate into the printing medium forming thus a dot for printing.

FIG. 5 shows a driving waveform to form a specified number of types of dots of different ink amount, and the driving waveform V1, V2 during a specified period of time causes dots of different ink amounts to be formed. And as the larger the difference of voltage of the driving waveform is, the greater is the degree of expansion and contraction of the piezo-element, the dot grows larger. As shown in the lower part of the figure, the present printer 20 can form roughly speaking three types of dots, large, medium and small, in terms of ink amount (for example, this maybe ink weight or ink volume) and each of large, medium and small dots may be broken down into three different types in terms of ink amount when they are printed on the printing medium. Therefore, for each color the printer discharges from the same printing head ink of different quantity in a plurality of different stages to form dots of sizes corresponding to the ink quantity of the plurality of stages. The raster data transmitted by the PC to the printer contain identification information for distinguishing the type of dots of nine different types (specified number), and the printer forms the type of dot corresponding to the identification information. And when raster data consisting of dot data expressing the type of dot for each raster is inputted, the printer forms dot of a plurality of different types of different ink amounts corresponding to raster data on the printing medium.

The PC 10 incorporating a printer driver for controlling the printer I/F 17e through the OS and the like executes various controls. The APL exchanges data with the hardware through the OS. The printer driver is operated when the printing function of APL is executed, can communicate bidirectionally with the printer 20 through the printer I/F 17e, receives the printing data from the APL through the OS, converts them into raster data and transmits the same to the printer 20.

And the color correcting program of the present invention may be constituted by any one of the OS, APL, OS and APL. The medium recording these programs may be, in addition to HD 14, CD-ROM, FD, semiconductor memory and the like. And the communication I/F 17d may be connected with the Internet network, and the program of the present invention may be downloaded from the specified server and may be executed.

The printing control device U0 shown in FIG. 1 includes an error information acquiring unit U1 constituting an error acquiring unit and various units U21-U26 constituting a printing control unit. The memory 31 of the printing head unit of the printer records the ID (error information) 31a showing the results of comparing the calorimetric data obtained by measuring the color of the patches (standard image) for correcting color of the standard recording amount printed by the printer on the printing medium in the color spaces Lab for all the six color of ink and all the nine types of dot or in total 54 types and the reference calorimetric data.

The error information acquiring unit U1 acquires the ID 31a of all the 54 types from the printer 20 and stores them in the HD 14.

The image inputting unit U22 inputs image data DA1 and converts them into RGB data DA2 expressing image by gradation by a plurality of picture elements for each RGB (red, green, and blue) color. The color converting unit U23 converts RGB data DA2 into CMYRVK data DA3 expressing image by gradation in a plurality of picture elements for each CMYRVK. The dot distributing unit U3 converts CMYRVK data DA3 into dot amount data (printing data) showing dot forming amount of a plurality of types of different ink amount grouped together by the same type by referring to a dot distributing table 14d stored in the HD. Here, the dot amount compensating unit U21 controls the dot distribution unit U24 to correct and convert dot amount data expressing image into dot amount data DA4 compensating of color drifts in image to be printed by the printer by means of ID acquired by the error information acquired unit U1.

The half-tone processing unit U25 executes a specified half-tone processing on corrected dot amount data DA4 to generate half-tone data DA5. The rasterizing processing unit U26 executes a specified rasterizing processing on the half-tone data DA5 to generate raster data DA6 and send them to the printer. The processing executed by these units U25 and U26 controls the printer to print image for printing corresponding to the corrected dot amount data DA4.

(2) Description of the Error Information Generating Method

The color correcting system shown in FIG. 4 is made on the assumption that it will be used at printer producing factories, and a calorimeter 40 is connected with the PC 10 and printers subjected to calibration (hereinafter referred to also as "objective printer") will be successively connected thereto. And a reference printer (a reference printing device) serving as a reference, the first printer (the first printing device) consuming a relatively small amount of ink adhering on a printing medium and the second printer (the second printing device) consuming more ink adhering on the printing medium than this first printer will be connected as required thereto. And the objective printers will be subjected to calibration operation taking the color of image for printing reproduced on the printing medium by the reference printer as the reference color.

According to the color correcting method of the present embodiment shown in FIG. 3, the execution of the steps S1-S5 in successive sequence results in the compensation of the color of the objective printers charged to print patches for correcting color (standard image) by correcting printing data expressing image.

Figure 6:
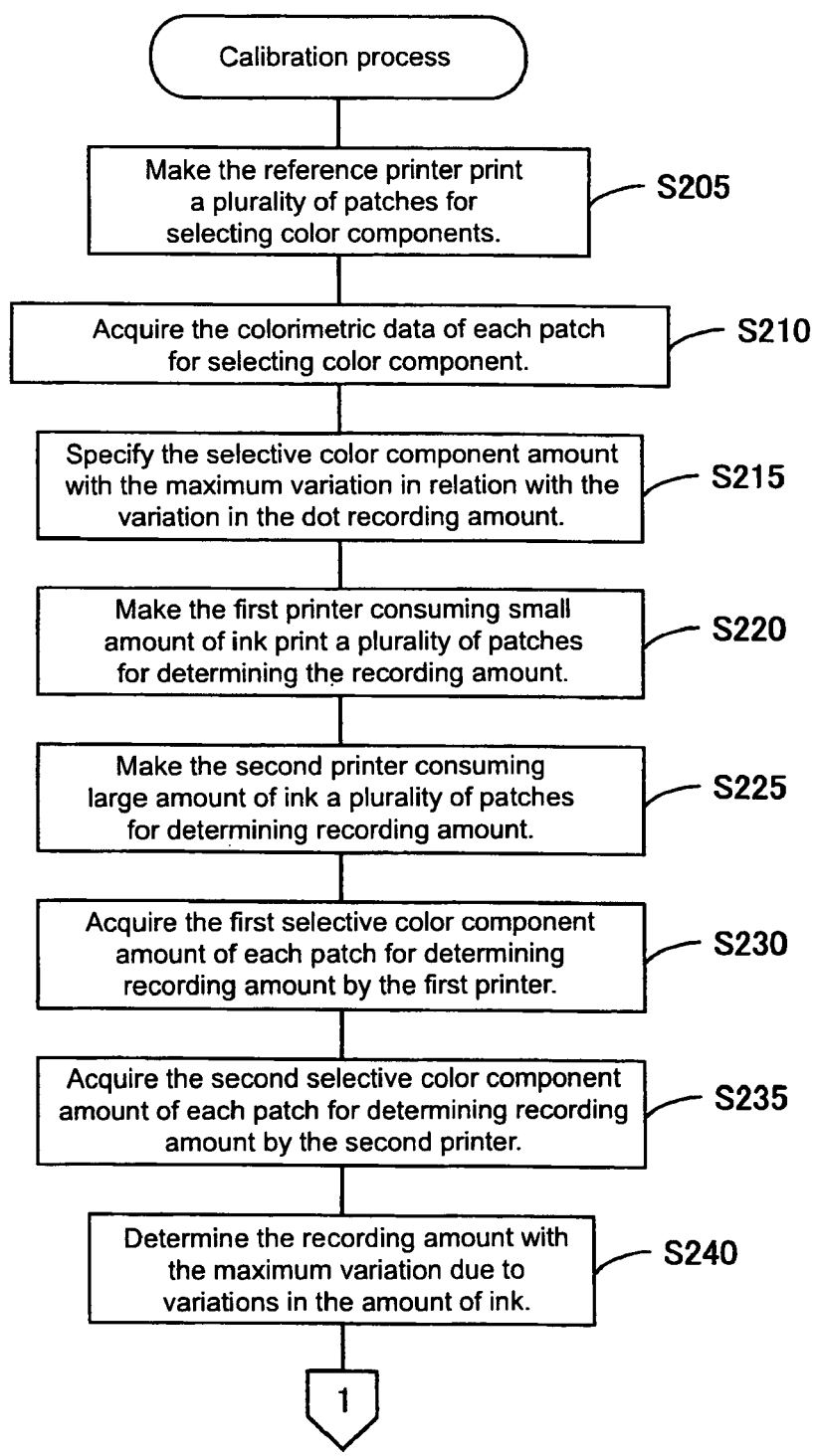
FIG. 6 is a flowchart showing the calibration process.
Figure 7:
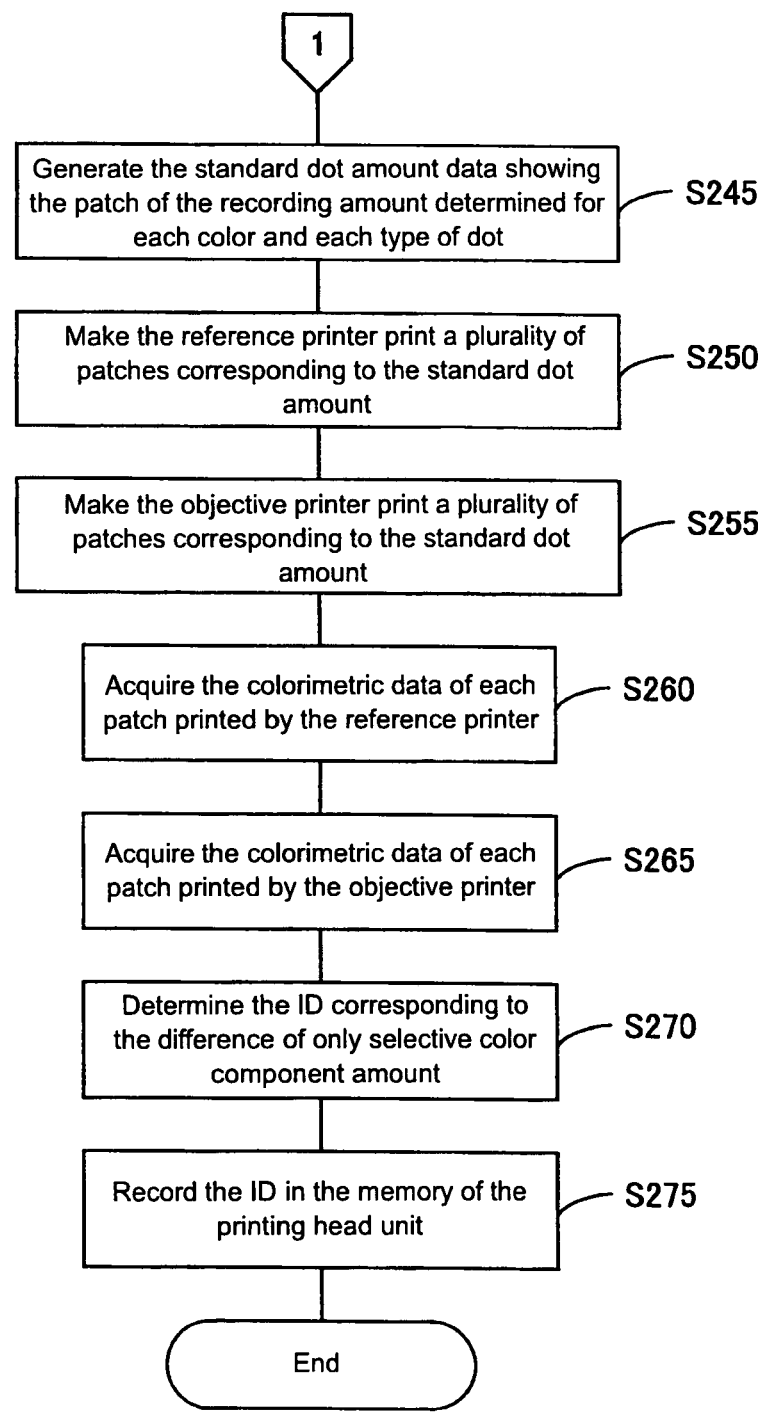
FIG. 7 is a flowchart showing the calibration process.

Here, as shown in FIGS. 6 and 7, the method will be described together with the calibration processing executed by the PC in the capacity of color correcting device.

In the color component selection process S1, in the first place, the reference printer is connected with the PC 10, and for each color of ink and each dot size, in other words for each combination of ink color and type of dot, standard dot amount data expressing a plurality of patches P1 for selecting color components (image for selecting color components) with varying dot recording amount are generated from a plurality of stages of dot recording amounts (a type of ink recording amount) contained in specified recording amount data for selecting color components 14g stored in the HD 14, and the PC 10 is charged to control the reference printer to print on the printing medium each patch P1 for selecting color component corresponding to the standard dot amount data (step S205). Hereinafter, the word "step" will be omitted). The standard dot amount data are data expressing patches for selecting color components for each color of ink and dot type by means of gradation data for every large number of picture elements in the form of dot matrix. The standard dot amount data are subjected to a specified half-tone processing and a specified rasterizing processing to produce raster data. When the raster data are sent to the printer, a plurality of patches P1 for selecting color components are printed. These patches P1 are printed for each color and each ink size (each type). Each patch P1 is a printed image consisting of a primary color by using only one type of ink, and the whole print is a uniform and plain image. Here, the dot recording amount may be, for example, the number of dots formed in a unit area on printing medium. In this case, when the weight of ink adhering on a unit area of the printing medium is taken as the recording density of ink (a type of recording amount of ink), the product acquired by multiplying the recording amount of dot by the weight of dot drop will be the recording density of ink.

As for printing medium, glossy papers such as photographic paper are preferable from the viewpoint of acquiring stable coloring of ink and performing a high precision color compensation. However, ordinary paper less glossy than glossy paper is preferable from the viewpoint of reducing costs involved in calibration operation.

Then, the colorimeter 40 is used to measure in the color space Lab the color of each patch P1 for selecting color component printed on the printing medium and to acquire colorimetric data consisting of a plurality of color component amounts L, a and b for each patch P1 for selecting color component (S210). Here, each color component amount L, a and b is the amount L, the amount a and the amount b defining the color space Lab CIE (1976) specified also in JIS Z8105. It is needless to say that all the color component amounts may be expressed by gradation values of the same specified number of gradations (for example 256 gradations) by converting the amount L, the amount a and the amount b by a primary equation. Each gradation value consists of a plurality of color component amounts, and the expression of a plurality of color component amounts in color space entirely by gradation values of the same number of gradations assures the color reproductiveness of objective printers with the reference color to be obtained.

And the calorimetric data acquired and the recording amount of dot by which a plurality of patches P1 for selecting printed color components serve as the basis for specifying the selective color component amount having the maximum variation with the variation of dot recording amount from among a plurality of color component amounts L, a, and b as the color component amount for correcting the printing data (S215).

Figure 8:
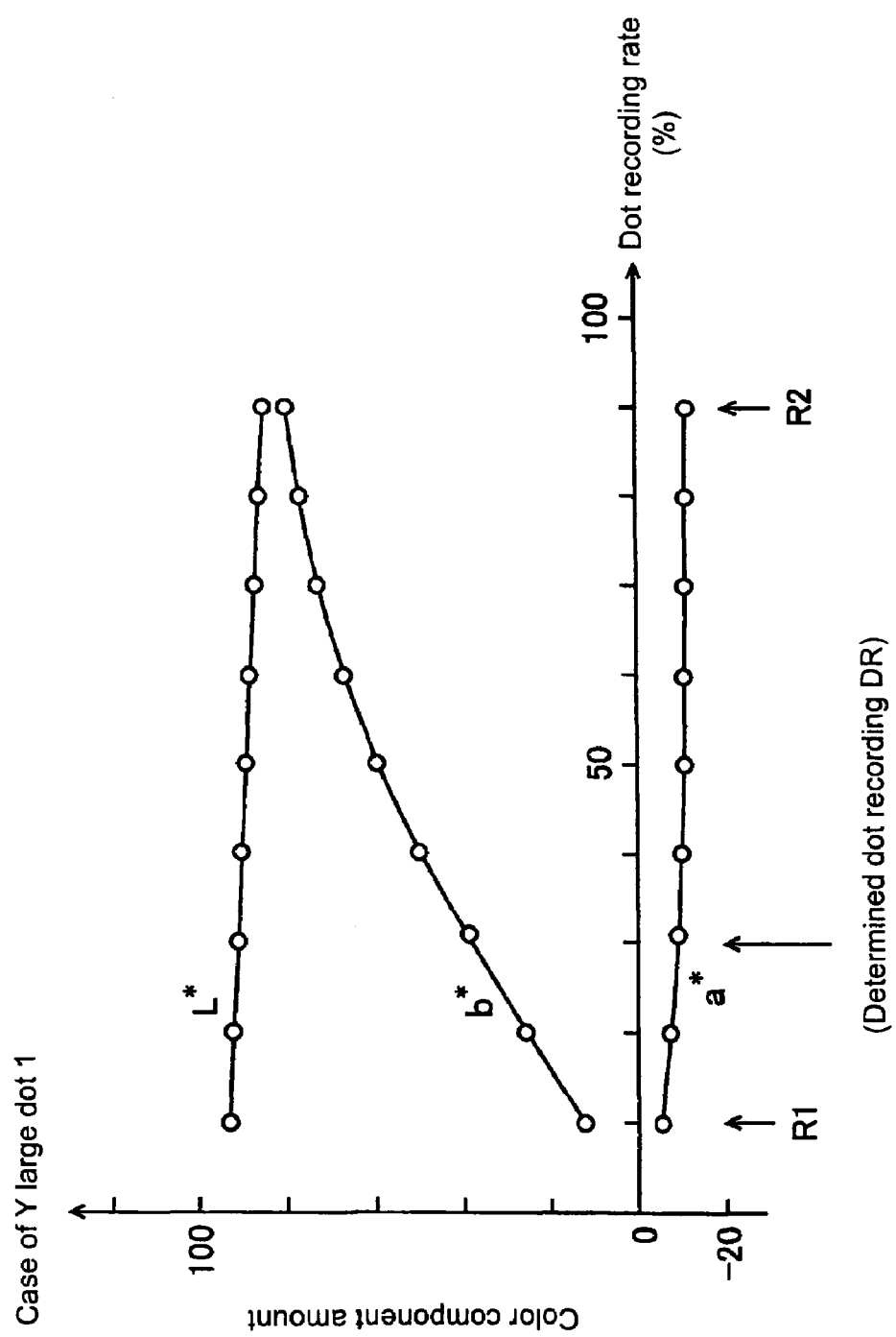
FIG. 8 is an illustration showing an example of the results of measuring color of the color component amounts L, a, and b for the dot recording ratio.

FIG. 8 shows, with regards to Y large dot 1, an example of the result of measuring the ratio of the number of dots formed to the total number of picture elements in the specified area on the printing medium, in other words, the dot recording rate (a type of recording amount of ink) which is a relative value of the dot recording amount by printing the patches for selecting index amounts of nine stages ranging from 10% to 90% and increasing by step of 10% on a coated paper and measuring their colors in the color space Lab. Here, the horizontal axis represents dot recording rate (by %), and the vertical axis represents L amount, a amount, and b amount defining the color space Lab. In the example shown by the figure, b amount representing the maximum variation in relation to the variation in dot recording rate among the index amounts L, a, and b is chosen as the selective index amount and is specified as the color component amount for correcting the printing data.

For example, in the color and type of dot for specifying the selective index amount, the mutually different dot recording rate is represented by R1 (the first recording amount) and R2 (the second recording amount), and the index amounts L, a, and b at the time when the color of the patch for selecting the index amount having a dot recording rate R1 is measured are respectively represented by L1, a1, b1, and the index amounts L, a, b at the time when the colors of the patches for selecting index amounts of a dot recording rate R2 (R2>R1) are measured and respectively represented by L2, a2, and b2. When differences of index amounts for the patches for selecting both index amounts of R1, R2 $\Delta L=|L2-L1|$, $\Delta a=|a2-a1|$, $\Delta b=|b2-b1|$ are calculated, the value of $\Delta L$, $\Delta a$, and $\Delta b$ will grow larger as the difference of index amounts for the patches for selecting both index amounts of the recording rate R1 and R2 grows larger. Therefore, the index amount corresponding to the maximum calculated value from among $\Delta L$, $\Delta a$, and $\Delta b$ can be specified as the selective index amount. Moreover, when the minimum dot recording rate and the maximum dot recording rate from the varied dot recording rates are represented by the recording rate R1 and R2, the objective printer will acquire a good color reproductiveness in relation to the reference color.

When the selective color component amount is specified, in the step S2, in the first place, the first printer wherein the amount of ink adhering on the printing medium is relatively small and the second printer wherein the amount of ink adhering on the printer medium is relatively large are connected with the PC 10, and for each color of the ink and type of dot, the PC 10 is charged to control the first and second printers to print a plurality of patches for determining recording amounts (image for determining the recording amount) P2 of which the dot recording amounts are varied from the dot recording amount of a plurality of stages contained in the specified recording amount data for determining recording amount stored in the HD on the specified printing medium (S220-S225). The standard dot amount data are data expressing the patches for determining recording amount by each color of the ink and each type of dot by gradation data for each large number of picture elements in the form of dot matrix, and for printing the plurality of patches P2, the standard dot amount data are subjected to the half-tone and rastering processing, and the raster data generated may be sent to the printer. These plurality of patches P2 are printed by transmitting these raster data to the printer. These patches P2 are printed for each color and dot size (for each type of ink). Each patch P2 is a printed image made of primary color by using only a type of ink, and the whole print is a uniform plain image. Here, when the first printing head of which the weight of ink discharged is relatively heavy is fixed on the reference printer, it will make up the first printer, and when the second printing head of which the weight of ink discharged is heavier than the first printing head is fixed on the reference printer, it will makeup the second printer.

Then, the calorimeter 40 is used to measure the colors of each patch for determining the recording amount printed by the first printer in the color space Lab to acquire the selective index amount selected in the step S1 for each patch P2 for determining the recording amount (S230). The selective index amount acquired here is the first selective index amount (the first colorimetric data). And the calorimeter 40 is used to measure the colors of each patch P2 for determining the recording amount printed by the second printer in the color space Lab to acquire the selective index amount selected in the step S1 for each patch P2 for determining the recording amount (S235). The selective index amount acquired here is the second selective index amount (the second calorimetric data).

And the recording amount with the maximum due to the variation in the amount of ink adhering on the printing medium occurring for each printer with regard to the selective index amount from the first and second calorimetric data and the dot recording amount of having printed a plurality of patches P2 for determining the recording amount is determined as the standard recording amount and is stored in the RAM 13 (S240). The recording amount 13c stored is determined for each color and type of dot, and is regarded as the dot recording amount of each patch P3 for correcting colors used for correcting the colors of the objective printer.

Incidentally, processes as shown in FIG. 6 are performed for all colors and types of dots.

With regard to the large dot 1 for Y described above, as b amount is a selective index amount, b amount of the patch P2 for determining a plurality of recording amount printed by the first and second printers is acquired, and each b amount acquired and the dot recording amount are used to determine the dot recording amount of each patch P3 for correcting colors.

Figure 9:
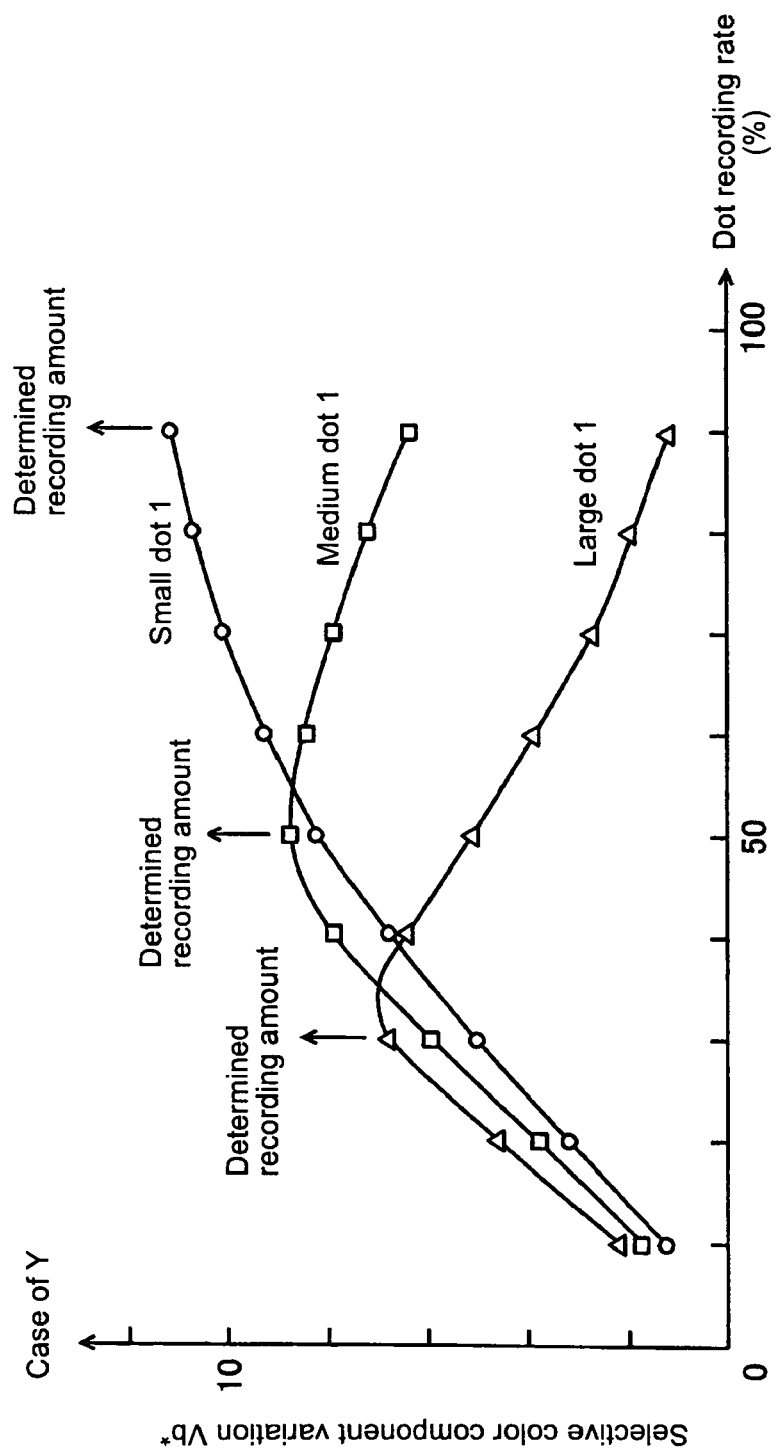
FIG. 9 is an illustration showing an example of selective color component variation for the dot recording ratio by the type of dot.

FIG. 9 shows an example of the result of calculating the amount of variation of the selective index amount (b amount) for each dot recording rate with regard to Y large dot 1/medium dot 1/small dot 1 by printing the patches for selecting index amounts of nine stages ranging from 10% to 90% and increasing by step of 10% on a coated paper and measuring their colors in the color space Lab. Here, the horizontal axis represents dot recording rate (by %), and the vertical axis represents the amount of variation (Vb) of the b amount. In the example shown by the figure, in the case of the large dot 1, dot recording rate 30% has the maximum amount of variation Vb, and therefore the dot recording amount for the patch P3 for correcting colors (determined recording amount) is determined to be 30%. Likewise, in the case of the medium dot 1, the dot recording amount for the patch P3 for correcting colors is determined to be 50%, and in the case of the small dot 1, the dot recording amount for the patch P3 for correcting colors is determined to be 90%.

Generally, when each dot recording rate is represented by Ri (i is an integer of 2 or more) and the first and second selective color component amount based on each recording rate of Ri is represented by S1i and S2i, the selective color component amount variation VSi at each recording rate Ri can be calculated, for example, by VSi=|S2i−S1i|. And a dot recording rate Ri corresponding to the maximum VSi from among a plurality of VSi can be determined as the dot recording rate DR for the patch P3 for correcting color.

It is needless to say that selective color component amounts at each dot recording rate Ri may be acquired for three or more printing devices, and variations VSi at each recording rate Ri may be values acquired by statistical calculations such as dispersion or standard deviation.

In addition, with regards to a plurality of printers, the weight of ink (ink amount) discharged from their printing heads may be measured, and the printer that discharges ink at the lower limit of variation of the ink weight may be called as the first printer, and the printer that discharges ink at the upper limit of variation of the ink weight may be called as the second printer. In other words, the first printer is a printer that makes ink adhere on the printing medium at the lower limit of variation of the ink weight, and the second printer is a printer that makes ink adhere on the printing medium at the upper limit of variation of the ink weight. Then, it will be more certain that the dot recording amount of which the variation will be the maximum due to variation of ink amount adhering on the printing medium with regards to the selective index amount will be determined, and the color reproductiveness of the objective printer in relation to the reference color can be improved.

Once the dot recording rate of the patch P3 for correcting color is determined, in the step S3 of controlling the printing of the standard image, in the first place the reference printer is connected with the PC 10, and the standard dot amount data 13d for expressing the patch for correcting the reference color of the recording amount (standard image for reference) for each color of the ink and the type of dot from the recording amount 13c determined during the step S2 will be generated (S245), and the PC 10 will be charged to control the reference printer to print each patch P4 for correcting the reference color corresponding to the standard dot amount data 13d on the printing medium (S250). Or, the printers subject to calibration are connected with the PC 10, and the standard dot amount data 13d for expressing the patch for correcting the color of the recording amount (the standard image) for each color of the ink and the type of dot from the recording amount 13c will be generated, and the PC 10 will be charged to control the reference printer to print each patch P3 corresponding to the standard dot amount data 13d on the printing medium (S255). The standard dot amount data 13d are data expressing patches for correcting color by the color of the ink and the type of dot in the form of gradation data for each of a large number of picture elements in the form of dot matrix, and for having the plurality of patches printed, the standard dot amount data may be treated with half-tone processing and rasterizing processing, and the raster data thus generated may be transmitted to the printer.

Figure 10:
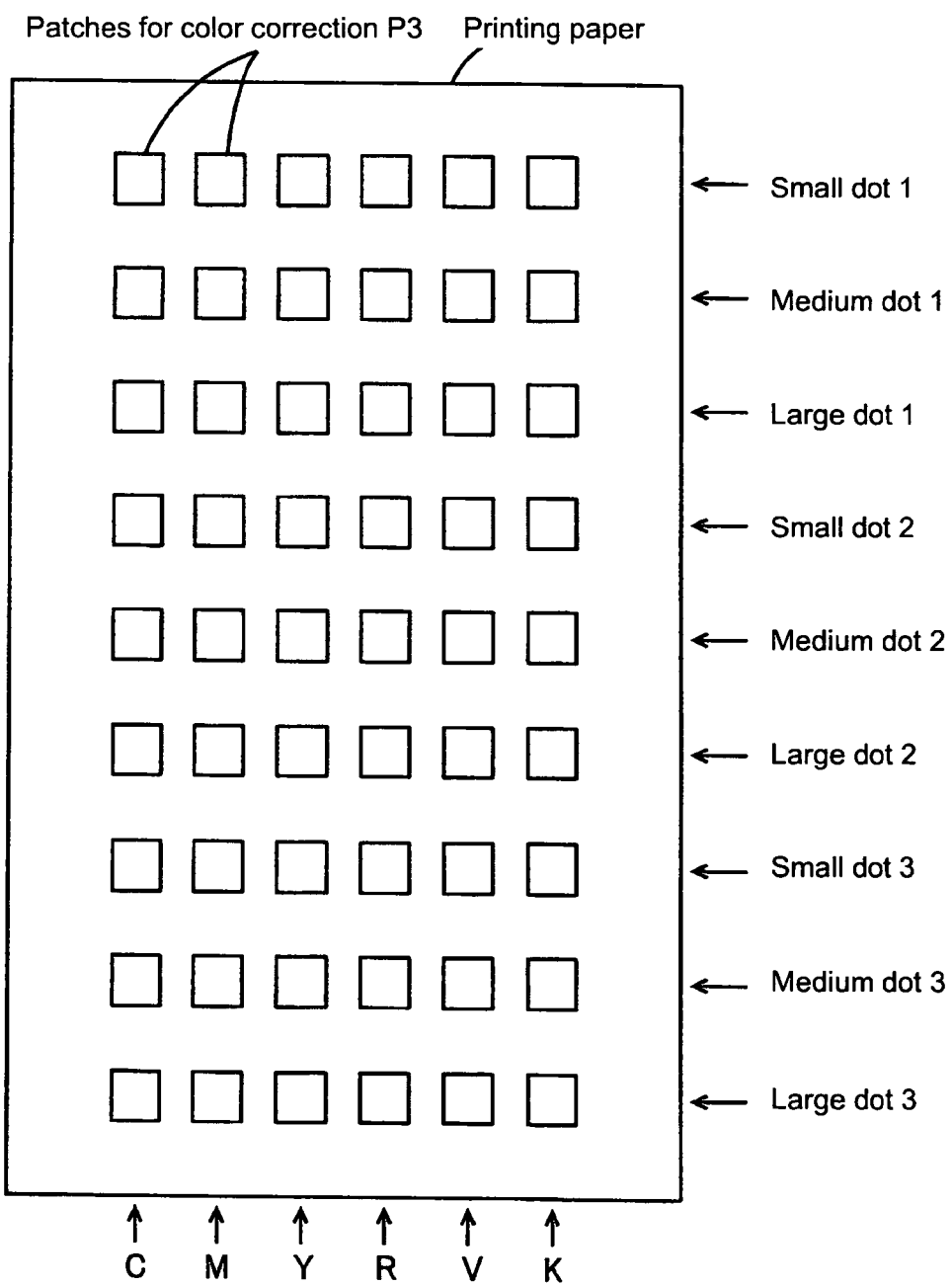
FIG. 10 is an illustration showing a calibration sheet.

FIG. 10 shows a calibration sheet wherein a plurality of patches P3 for correcting color are printed on a sheet of printing paper. And a calibration sheet wherein a plurality of patches P4 for correcting reference color on the same type of printing paper is made in a similar way. Each patch P3 constitutes a printing image consisting of a primary color wherein only one type of ink is used, and the whole print is a uniform plain image. It is needless to say that a printed image consisting of secondary or more color wherein two or more types of ink are used may be used for patches for correcting color or for correcting the reference color. The same plurality of patches P3 are deemed to be image of only one type of standard dot recording amount occurring for each color of ink, the type of dot. The example of the figure shows that 54 patches P3 resulting from the multiplication of the number of ink types 6 by the types of dot 9 are printed. The limitation to only one type of patch for correcting color for each condition to be printed for the correction of color of the objective printer can speed up the calibration operation. Here, each patch P3 is printed by the dot recording amount determined in the step S2. In other words, each patch for correcting color will be printed by the dot printing amount having the maximum variation due to variations in the amount of ink adhering on the printing medium occurring for each printer for the selective color component amount specified from among the color component amounts L, a, and b in the color component selecting step.

Incidentally, if each patch P4 conform to the conditions mentioned above is printed in advance by the reference printer on the printing medium, the step of having the reference printer print patches for correcting color can be omitted in the step S3.

As described above, in the step S3, the objective printer is controlled to print on the printing medium standard image of the standard recording amount in each ink.

Once the patches P3 for correcting color are printed, in the step S4 for acquiring colorimetric data, in the first place, the color of each patch for correcting color printed by the reference printer on the printing medium is measured by the colorimeter 40 in the color spaces Lab, and calorimetric data of the patch for correcting color are acquired for each color of ink and type of dot (S260). These colorimetric data are the reference calorimetric data serving as the reference of the calorimetric data. And the color of each patch P3 for correcting color printed by the objective printer on the printing medium is measured by the colorimeter 40 in the color spaces Lab to acquire the colorimetric data of the patch P3 for each color of ink and type of dot (S265). In the present embodiment, the calorimeter 40 outputs all the color component amounts L, a, and b to the PC, and therefore the PC is described as receiving all the L amount, a amount and b amount of each patch. However, it may acquire only selective color component amount from among the L amount, a amount and b amount. Then, the structure and configuration of the programs and devices for carrying out the present color correcting method are simplified.

Incidentally, if the colorimetric data of each patch for correcting color printed in advance by the reference printer on the printing medium are prepared and made available, the step of acquiring the calorimetric data for each patch 4 printed by the reference printer can be omitted in the step S4.

Once the colorimetric data of the patch for correcting color have been acquired, in the step S5 for correcting color, the calorimetric data of both patches P4 and P3 are compared for each color of ink and each type of dot, and a color adjusting ID 31a wherein the ID value the results of comparison are expressed is determined (S270), and the ID31a is stored in the memory 31 of the printing head unit(S275). When a PROM and the like is chosen for the memory 31, a ROM writer and the like may be used to store the ID 31a in the memory 31. Or, the ID may be stored in ROM 22 of the printer.

For comparing the colorimetric data of both patches P3 and P4, the comparison is made by only the selective color component amount specified in S1. Then, the ID 31a generated will constitute information wherein the comparison result of. Of course, the ID 31a can be considered as the result of comparison of which the color component amount is the maximum value. As the example of FIG. 3 shows that the b amount is chosen as the selective color component amount, the b amount of the patch P4 for correcting the reference color and the b amount of the patch P3 for correcting color are compared to acquire the value of Δb, and the comparison result ID is formed based on the value of the Δb acquired.

Here, when the selective color component amount of the patch for correcting reference color is represented by S0, the selective color component amount of the patch for correcting color is represented by SS, and the specified coefficient is represented by c (c>0), the value of the comparison result ID can be calculated by, for example, ID=c·(SS−S0).

It should be noted in passing that the processing of S255, S265-S275 will be executed by all the objective printers.

Figure 11:
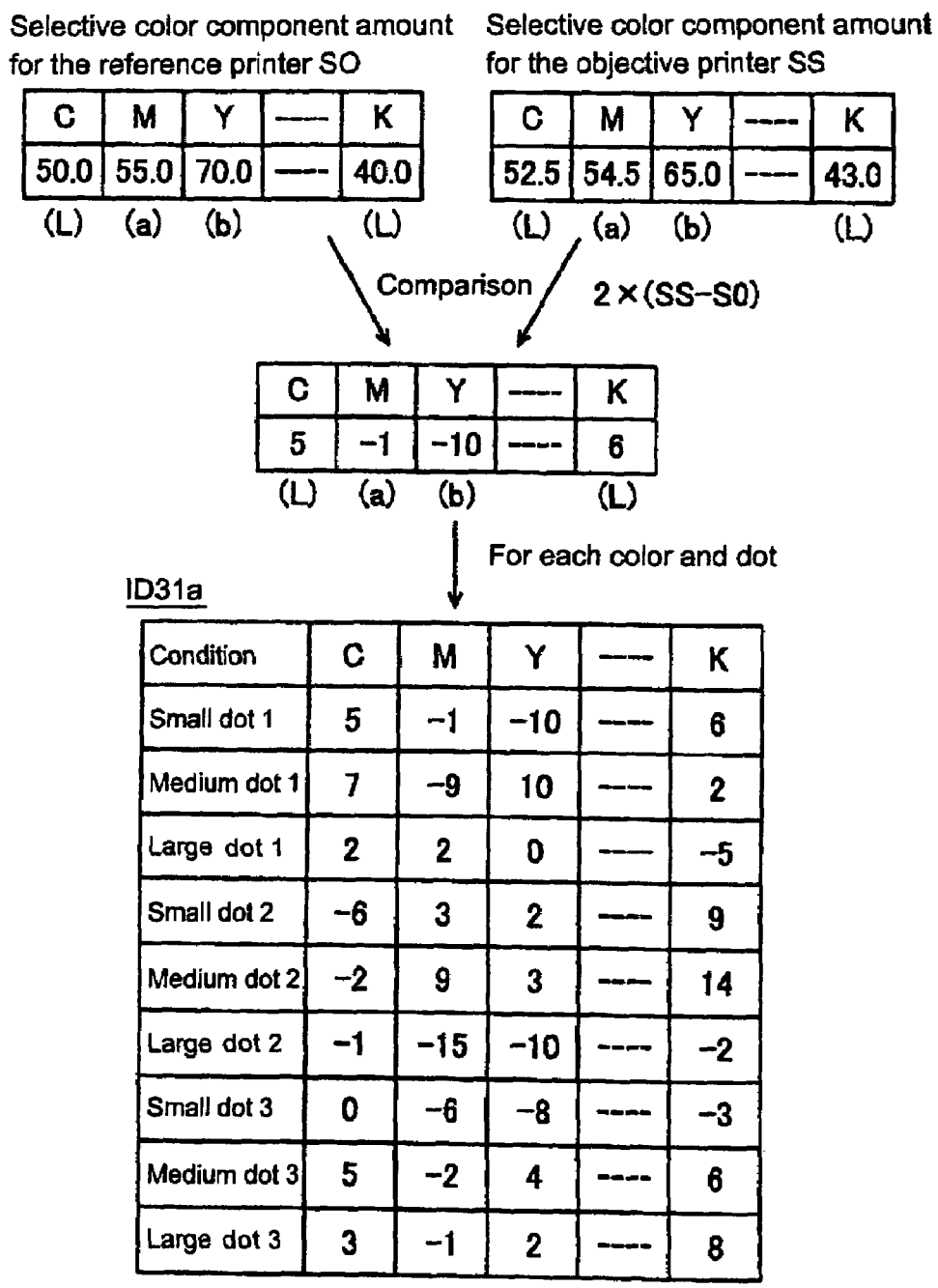
FIG. 11 is an illustration showing schematically the mode of determining color adjustment ID.

FIG. 11 shows how ID is determined. The upper row of the figure shows the selective color component amounts S0 and SS that can be obtained by measuring the color of each patch P4 and P3 for each color when the type of dot is small dot 1. In the case of small dot 1, the selective color component amount in the case where the ink is C is L amount, the selective color component amount in the case where it is M is a amount, the selective color component amount in the case where it is Y is b amount, and the selective color component amount in the case where it is K is L amount. In this way, the selective color component amount is specified for each color, and the selective color component amount obtained by measuring color will be a color component amount corresponding to the color of ink.

After the selective color component amount S0 and SS for both patches P4 and P3 have been acquired for each color and size of dot, the formula ID=c·(SS−S0) is applied to calculate the value of ID. The middle row of the figure shows the values of ID for each color in the case of small dot 1. Here, the values of ID for all 54 types representing the combination of all six color of ink and all nine types of dot are calculated. An example of values calculated for all the ID are shown in the lower row of the figure.

In this way, ID for each color of ink and type of dot can be generated. And each ID generated is stored in a specified area in the memory 31.

The ID generated is a piece of error information expressing the results of comparing only the selective color component amounts specified in the step S1 as the color components having the maximum variations with the variations in dot recording rate from among the color component among L, a and b in the color space Lab. The ID is a piece of error information showing the results of comparing the calorimetric data obtained by measuring in the color space Lab only the color of patches for correcting color printed by the printer on printing medium by the dot recording amount having the maximum variation in calorimetric data due to variations in the amount of ink adhering on the printing medium occurring for each printer.

When an ID has been stored in the memory 31, the printing data from which color data are expressed are corrected to the ones for compensating color drifts in the image for printing printed by the objective printer by reading the ID 31 from this memory and using the same ID. This will enable to correct the printing data to make the printer that printed patches for correcting color compensate color.

(3) Printing Control Processing

Figure 12:
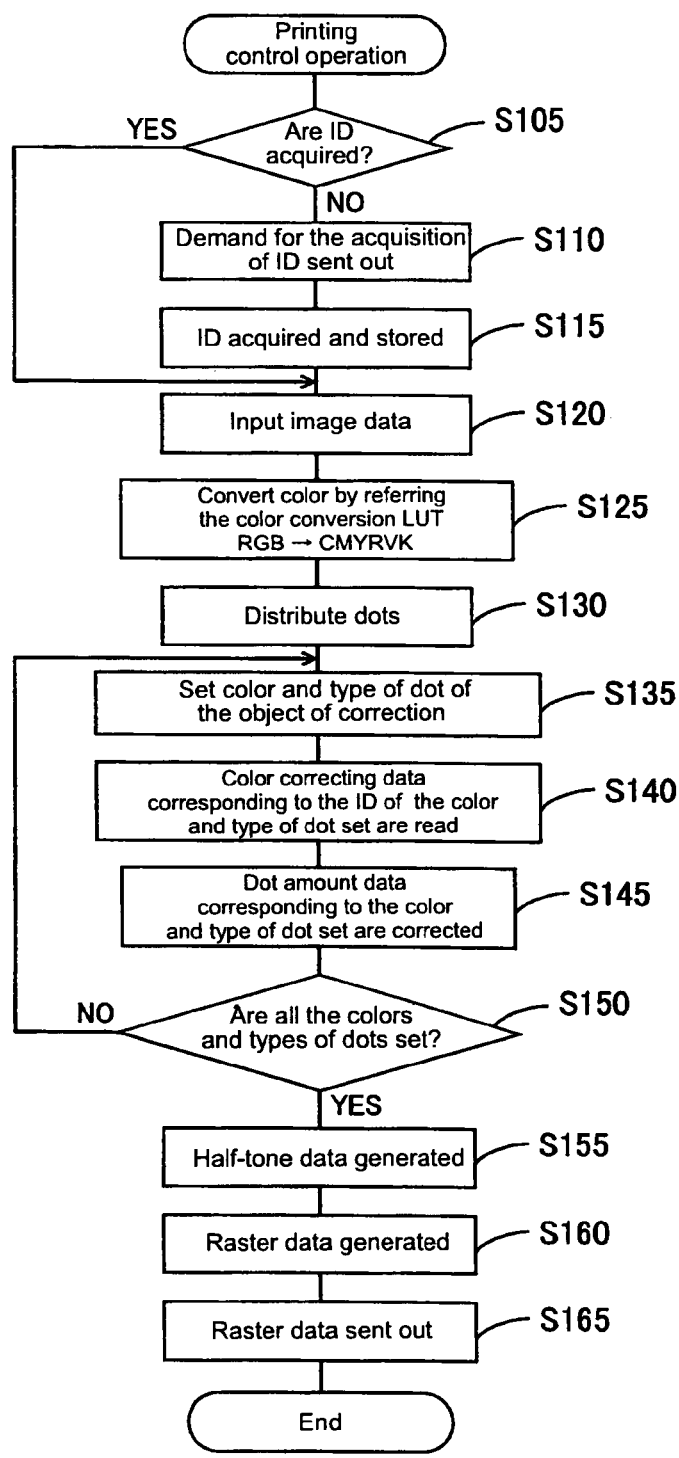
FIG. 12 is a flowchart showing the printing control process.
Figure 13:
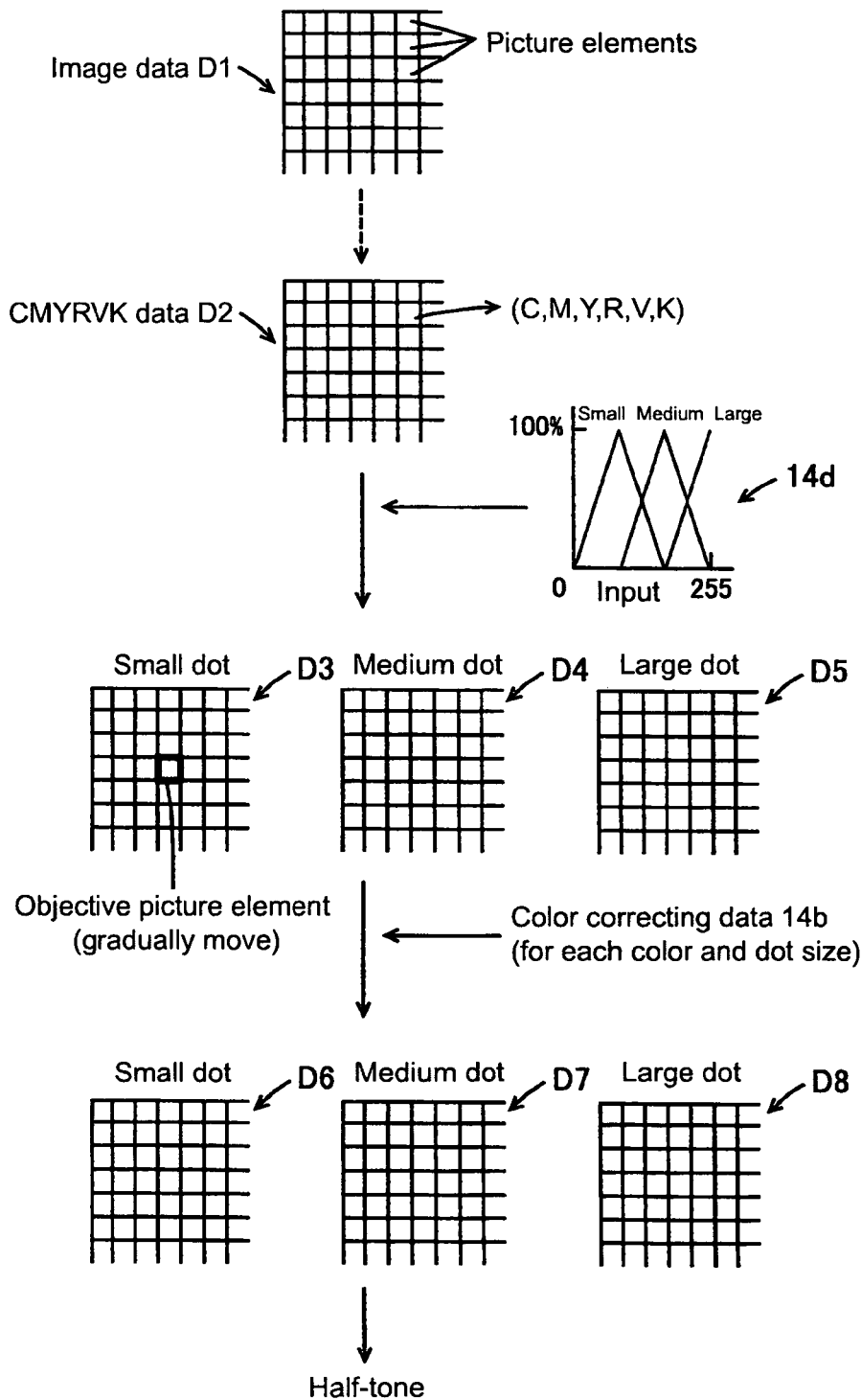
FIG. 13 is an illustration schematically showing the printing control process.
Figure 14:
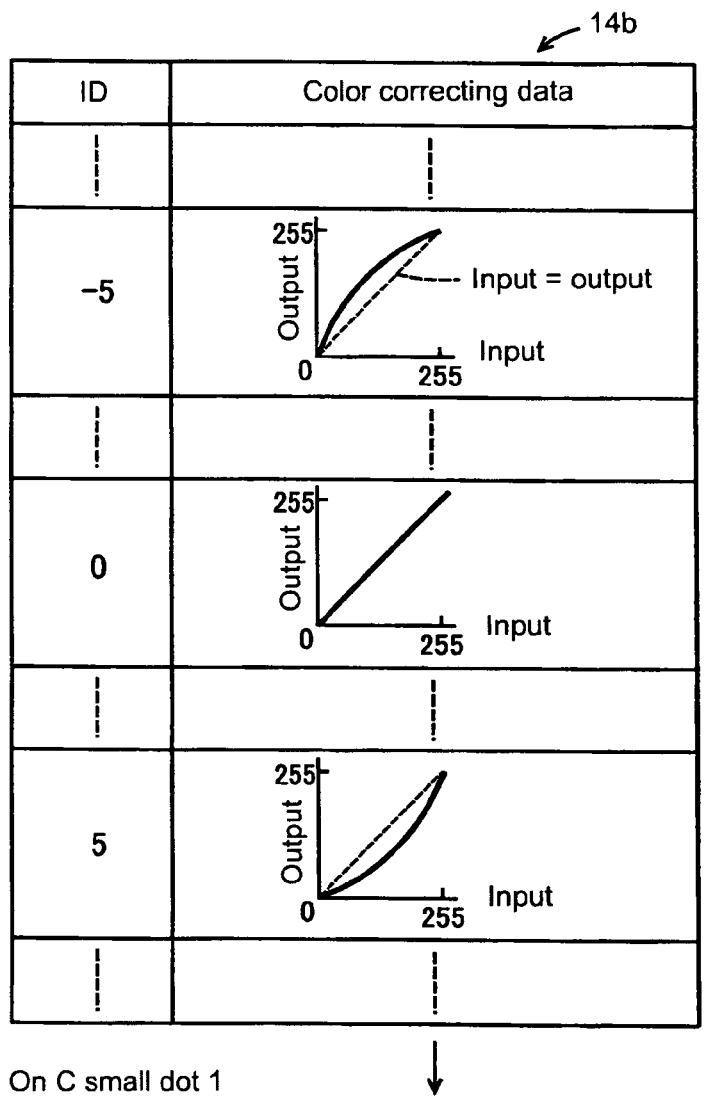
FIG. 14 is an illustration schematically showing the structure of a plurality of color correcting data.

FIG. 12 is a flowchart showing the process of correcting printing data by using ID 31a and executing printing control based on the corrected printing data. FIG. 13 is an illustration showing schematically the processing. FIG. 14 is an illustration showing schematically the structure of a plurality of color correcting data 14b stored in the HD14. The color correcting data 14b corresponds to the ID of the stage for each stage of the value of ID and is stored in the HD.

In the first place, the PC 10 judges through the error information acquiring unit U1 whether ID 31a has been acquired from the printer 20 or not (S105). If the condition is fulfilled, the PC 10 judges that it is no longer necessary to acquire ID from the printer and proceeds to S120. Incidentally, when the printer connected with the PC 10 has been changed, it will judge that there is no ID corresponding to the printer and proceeds to S120.

When the condition has not been fulfilled, it will make a demand for acquiring a color adjusting ID and transmit the same to the printer 20 (S110). Then, the printer 20 receives the demand for acquiring the same, and reads an ID 31a combining all the six types of ink and all the nine types of dot or all the 54 types from the memory 31 of the printing head unit and send them to the PC. Then, the PC acquires all the ID 31a and stores them in the HD 14 (S115). Thus, the color adjusting ID being incorporated in the printer, the user of the present printing system needs not input a separate color adjusting ID even if the printer has been replaced. Therefore, the present printing control device is convenient.

In S120, the image inputting unit U22 inputs image data D1 constituted by gradation data corresponding to a plurality of element color separately by a large number (a specified number) of picture elements, and converts the image into RGB data in a wide area RGB color space wherein the gradation of image is expressed in a plurality of picture elements for each RGB. At that time, data may be partially read or only pointers expressing buffer areas used for the delivery of data may be delivered. The image data D1 to be inputted are data expressing image by gradation data for each of a large number of picture elements in the form of dot matrix, and may be image data constituted by RGB defined in the sRGB color spaces, image data constituted by YUV in the YUV color indicating system and the like. It is needless to say that they may be data based on the Exif2.2 standard (Exif is a registered trade mark of the corporation the Electronic Information Technology Industrial Association), data based on Print Image Matching (PIM:PIM is a registered trade mark of Seiko Epson Corp.) and the like. Since each component of image data consists of a variety of number of gradations, image data are converted into RGB data of each RGB having 256 gradations in a wide area RGB color space according to the definition of sRGB and YUV color indicating system and the like. The RGB data are printing data of which image is expressed by a plurality of element colors RGB.

Then, the RGB data are converted in color into CMYRVK data D2 constituted by gradation data corresponding to the respective amount of use of the CMYRVK inks by making the gradation data of each picture element constituting the RGB data, by successively transferring the objective picture elements as object of conversion and by referring to the color conversion LUT 14c by the color converting unit U23 (S125). The color conversion LUT 14c is an information table defining the relationship of correspondence between the RGB data and the CMYRVK data expressing the gradation of image by the same number of picture elements for each CMYRVK with regards to a plurality of reference points. When the CMYRVK data matching with the RGB data inputted are not stored in the color conversion LUT, CMYRVK data corresponding to a plurality of RGB data close to the RGB data inputted are acquired, and are converted into the CMYRVK data corresponding to the RGB data by volume compensation and other compensatory calculation. The CMYRVK data D2 are, like the RGB data, printing data expressing the image by gradation data for every large number (specified number) of picture elements in the form of dot matrix, and are CMYRVK data of each 256 gradations expressing the amount of use of each ink discharged from the printing head of the printer 20.

Then, the dot distributing unit U24 converts the gradation data constituting CMRVK data by the gradation data by each of CMYRVK constituting the CMYRVK data after the color conversion (input gradation data) into dot amount data expressing the amount of dots formed by a plurality of types of different ink by the type of dot (output gradation data) by referring to the dot distribution table 14d, choosing the gradation data of each picture element constituting the CMYRVK data as the object of conversion and causing the objective picture elements to move successively. In this way, a dot distributing process is carried out (S130). In the present embodiment, color drifts are compensated by means of ID for correcting dot amount data (printing data).

As shown in the upper row of FIG. 15, the dot distribution table 14d is an information table that prescribes the relationship of correspondence between an input gradation data showing the amount of ink used in the printer and an output gradation table showing the amount dots formed by the type of dot. The table 14d is created for each color and stores the output gradation values showing the amount of dots formed in each gradation of the input gradation values by the type of dot. In FIG. 13, the horizontal axis represents the input gradation value and the vertical axis represents the relative value of the output gradation value, and shows schematically the dot amount data of each small, medium and large dot. The present embodiment provides three types of setting modes for the size of dot. Thus, in response to each setting mode 1-3, the dot distribution table 14d contains the output gradation data D11 referred at the time of forming small dot 1, medium dot 1 and large dot 1, the output gradation data D12 referred at the time of forming small dot 2, medium dot 2 and large dot 2, and the output gradation data D13 referred at the time of forming small dot 3, medium dot 3 and large dot 3.

In the dot distribution process, the gradation data are distributed into a plurality of dot use amount types corresponding to the setting modes 1-3, and as shown in FIG. 10, dot amount data for small dots D3, dot amount data for medium dots D4 and dot amount data for large dots D5 are generated. These dot amount data D3-D5 are, like the CMYRVK data, data expressing color images by gradation data for every large number (specified number) of picture elements in the form of dot matrix, and are data of 256 gradations for each CMYRVK expressing the amount of ink used for each dot discharged from the printing head of the printer 20.

However, even if dot amount data at this stage are used to have the printer print, the colors of the images printed on the printing medium may contain delicate errors. This results from shifts in the weight of ink discharged from each array of printing nozzles and delicate variation in voltage applied to the printing head when it is incorporated into the printer. And depending on this variation of voltage and the condition of the printing head incorporated, the dot printed on the printing medium sometimes crack and fail to be roughly circular, and as a result the color of the printed image sometimes develop delicate variations. Therefore, in order to compensate such variation in color, the dot amount data are compensated.

When each dot amount data is generated, the dot amount compensating unit U21 sets the color and type of dot serving as the object of correcting the dot amount data (S135). For example, the objective color and types of dot may be set from among all the 54 types by relating all the 54 types of all the inks and all the dots with different values, and renewing successively the values of pointers storing such values. Then, ID 14a of the color and type of dot set are read from the HD, the color correcting data corresponding to the value of the ID 14a are specified from among a plurality of color correcting data 14b stored in the HD, and the color correcting data are read out (S140). Here, as the color correcting data are data specifying the relationship of correspondence for color correction between the dot amount data before correction and the corrected dot amount data, the relationship of correspondence for color correction of dot amount data is specified on the basis of the ID. And the dot amount data of the objective picture elements are corrected with reference to the color correcting data read in S140 and the corrected dot amount data D6-D8 are generated, the gradation data of each picture element constituting the dot amount data corresponding to the color and type of dot chosen as the object of conversion and the objective picture elements are made to move successively (S145).

When the value of ID is negative, the degree of coloring on the printing medium of the objective printer is weaker than that of the reference printer. Therefore, as shown in FIG. 14, in order to intensify the degree of coloring of the printed image, the color correcting data are, as an overall trend, adjusted to produce larger output gradation values than the input gradation values. Therefore, the dot amount data characterized by colors and type of dot of positive ID values have, as a general trend, their gradation values largely corrected by referring to such color correcting data. On the other hand, when the ID has positive values, the objective printer has a greater degree of coloring on the printing medium than the reference printer. Therefore, as shown in the figure, in order to reduce the degree of coloring of the images for printing, the color correcting data are, as a general trend, adjusted to reduce the output gradation values than the input gradation values. Therefore, the dot amount data of which the colors and types of dots have positive ID values are, as a general trend, corrected towards smaller gradation values by referring to such coloring correcting data. This will enable the printing device having printed patches for correcting colors to compensate its colors.

Then, the question of whether all the colors and types of dots have been set or not is judged (S150), and if the conditions have not been fulfilled, the steps S135-S150 are repeated, and when the conditions have been fulfilled, the process passes to S155.

In S155, dot amount data for each size of dot are processed by the specified half-tone process (by the half-tone processing unit U25) including error diffusion method, dither method, density pattern methods and the like to generate half-tone data by CMYRVK of the same number of picture elements as the number of picture elements of the CMYRVK data. The half-tone data are data wherein the state of dot formation is expressed by the presence or absence of dot formed. For example, the presence of dot formed is represented by a gradation value "1" and the absence of dot formed is represented by a gradation value "0". Thus, the half-tone data can be turned into thresholded data corresponding to binary two gradations depending on the presence or absence of dot formed obviously, four gradation data and the like may be adopted.

And the rasterizing processing unit U26 rasterizes half-tone data generated as specified to rearrange them in the order used by the printer to generate raster data by each of the CMYRVK (S160), which are outputted to the printer 20 (S165) to terminate the flow. Then, the printer 20 receives the raster data expressing the image, drives the printing head to discharge ink adhering on the printing paper based on these data, and forms image for printing corresponding to the RGB data. As the raster data are data wherein color drifts are compensated by each of CMYRVK, image for printing are image wherein color drifts are compensated. Here, as the color of the objective printer is compensated based on the color adjusting ID expressing the result of comparing the colorimetric data of patches for correcting color actually printed by the objective printer on the printing medium and the reference calorimetric data, no delicate errors occur in the color of the image for printing due to delicate variation of voltage applied to the printing head. Therefore, the color reproductiveness of the printed image in relation to the reference color improves than before when the weight of ink only was compensated.

In this way, for inputting RGB data and converting them into dot amount data, the printer can be controlled to print image for printing a high image quality by specifying on the basis of ID the relationship of correspondence for the correction of color of dot amount data before and after correction for compensating errors in the reference calorimetric data in the calorimetric data of the patch for correcting color actually printed by the objective printer on the printer medium to convert the same into dot amount data corrected by the relationship of correspondence for the correction of color. Since the dot amount data for correction are corrected in such a way that color drifts to the reference calorimetric data in the calorimetric data of a patch for correcting color actually printed on printing medium by the objective printer maybe eliminated, the color reproductiveness of printed image in relation to the reference color will be greatly improved. In addition, if the printer can execute half-tone processing, multiple gradation CMYRVK data may be transmitted to the printer and the printer may correct the dot amount data.

Here, the relationship of correspondence for the correction of color of dot amount data before and after correction may be specified as described below.

Specifically, the objective printer is controlled to print on the printing medium the patch for correcting color for the standard recording amount for each color of ink and each type of dot, the color of the patch for correcting color printed on the printing medium in the specified color space consisting of a plurality of color components as their color component amounts such as the color space Lab are measured to acquire the calorimetric data of the patch for correcting the color. And the calorimetric data acquired and the reference calorimetric data are compared and the results of comparison, are used to specify the relationship of correspondence for correcting color before and after the correction of the dot amount data to compensate the color of the objective printer.

Then, the PC 10 for executing the printing control operation becomes a printing control device for correcting the dot amount data by the relationship of correspondence for the correction of color described above and for controlling the objective printer to print the printed image corresponding to the corrected dot amount data.

Incidentally, the printing data for correction at the time of compensation of color may include the dot amount data, half-tone data, raster data and the like. In the case of these data, the color of images for printing may be compensated by adjusting the number of dots to be formed on the printing medium at a ratio corresponding to the ID value. And when the size of dot is only one type, the CMYRVK data immediately after the color conversion may be printing data subject to correction. In the case of the CMYRVK data, in the same way as the correction of the dot amount data mentioned above, the colors of the images for printing may be compensated by correcting with reference to the color correcting data corresponding to the ID values. It is needless to say that, even in the case of RGB data before color conversion, the colors of images for printing may be compensated by preparing a color correcting LUT prescribing the relationship of correspondence between the RGB data before correction and the corrected RGB data corresponding to each value of the ID, and by correcting the RGB data by referring to the color correcting LUT corresponding to the ID values.

And when the dot size is only one type, besides the dot recording ratio, the recording density of ink represented by the weight of ink adhering on each unit area of the printing medium, the ratio of ink weight adhered on all the picture elements on the printing medium of the same area as the weight of ink when ink dots are formed on the whole area of the printing medium, in other words the recording ratio of ink and the like may be the recording amount of ink. And the colors of the printer may be compensated by specifying the selective color component amounts, selecting the ink recording amounts having the maximum variation due to variations in the amount of ink adhering regarding the selective color component amounts as the standard recording amount, printing the patches for correcting color, acquiring the colorimetric data of each patch for correcting color printed, and correcting said printing data by using the results of comparing only the selective color component amounts.

As described above, as error information expressing the results of comparing the colorimetric data of the patches for correcting color printed on the printing medium by the printer subject to printing control and the reference colorimetric data are used to compensate color drifts in the printer, no delicate error occurs in the color of image to be printed due to delicate variation in voltage applied to the printing head. Therefore, it will be possible to improve the color reproductiveness of the image to be printed in relation to the reference color. And as error information expresses the results of comparing the selective color component amount having the maximum variation with variations in the amount of ink adhering on the printing medium from among a plurality of color component amounts in the color space serving as the reference of measuring color and the results of comparing the calorimetric data of the patch for correcting color having the maximum variation due to variations of ink amount adhering on the printing medium, it is possible in this respect to acquire a good color reproductiveness of the image to be printed in relation to the reference color.

In addition, for generating error information, it is enough to generate error information by using the results of comparing the selective color component amounts having the maximum variation in the recording amount of ink from among a plurality of color component amounts in color space taken as the reference of measuring color. For this reason, the calibration operation of the printing device subjected to printing control requires no complicated calculations. Therefore, the calibration operation can be accelerated. And the limitation of colorimetric data to those of patches for correcting color of a recording amount in ink having the maximum variation in the calorimetric data at the time of generating the error information can speed up the calibration operation also in this respect.

(4) Variant

In the meanwhile, the computer and peripherals that can be used in carrying out the present invention can have various configurations. For example, the printing device may be one integrated with the computer. It may be a printing device designed to print only monochrome images. The flow mentioned above may be executed partially or wholly by a printing device or a dedicated color image processing device.

Figure 16:
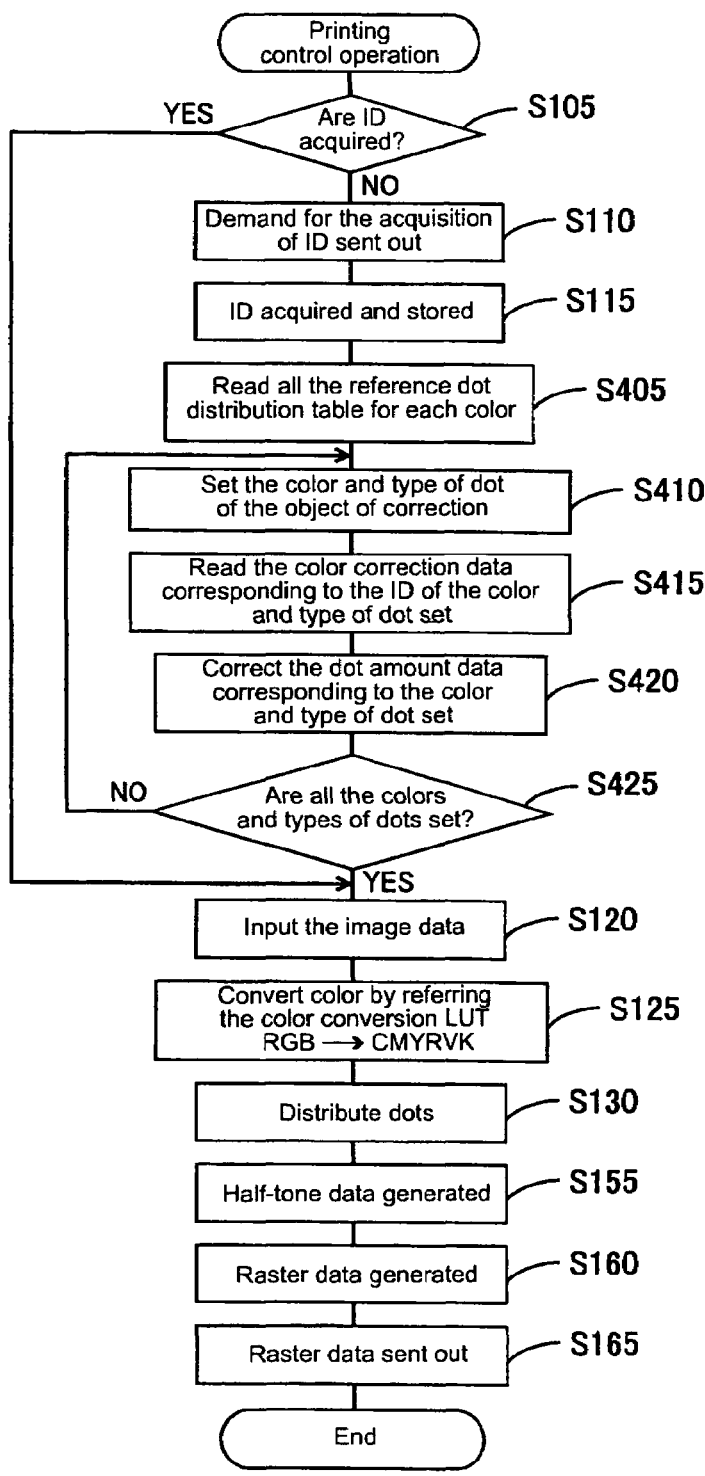
FIG. 16 is a flowchart showing the printing control process in a variant.

Or, as shown in FIG. 16, for correcting dot amount data, the dot distribution table 14d itself may be corrected and the dot amount data may be corrected by referring to the corrected table. And although in S105-S130 and S155-S165 the situation is roughly the same as FIG. 9, after the ID is stored in the HD 14 in S115, the process proceeds to S405.

In S405, the dot distribution tables 14d created for each color are wholly read from the HD. Then, the colors and types of dots for correcting the data of the table 14d are set (S410), and the ID 14a of the colors and types of dots set are read from the HD, and the color correcting data corresponding to the value of the ID 14a from among a plurality of color correcting data 14b stored in the HD are specified and the color correcting data are read (S415). Then, the data in the table 14d corresponding to the color and type of dot set are corrected by referring to the color correcting data read (S420).

As shown in the lower row of FIG. 14, the color correcting data 14b are regarded as an information table prescribing the relationship of correspondence between the input gradation values $A_i$ (i is an integer between 0-255) and the output gradation values for each color and type of dot with respect to each gradation (all the gradations) of the input gradation values $A_i$. In the case of gradation values for C small dot 1, the output gradation values $AC_i$ corresponding to the input gradation values $A_i$ are prescribed as shown by the solid line in the upper row of the figure. Such relationship of correspondence is also prescribed for the types of dots other than small dot 1, and is also prescribed for each type of dot with regard to MYRVK.

As shown in FIG. 15, the distribution table of both dots before and after correction is made in such a way that the CMYRVK data may be converted into dot amount data for each color and type of dot by referring to the output gradation values corresponding to the type of dot from the address corresponding to the value of each gradation data constituting the CMYRVK data. For correcting the reference dot distribution table 14d before correction, a corrected dot distribution table can be created by replacing the output gradation values of the table 14d with the output gradation values of the color correcting table 14b. For example, when the output gradation values of C small dot 1 in the reference table 14d are $A_i$, the output gradation values $A_i$ of C small dot 1 are corrected by replacing $A_i$ with $AC_i$ with regards to the output gradation values of the table 14d, because the color correction LUT of FIG. 14 stores the output gradation values $AC_i$ corresponding to the input gradation values $A_i$.

When the corrected dot distribution table has been created, the question of whether all the colors and types of dots have been set or not is judged (S425), and when the conditions are not fulfilled, S410-S425 are repeated, and when the conditions have been fulfilled, the process proceeds to S120, where the color image data are inputted, colors are converted, and the dot amount data are generated by referring to the corrected dot distribution table (S120-S130). And, the image for printing of which the colors are compensated by using the dot amount data can be printed by the printer (S155-S165).

As a result, the operation of correcting the printing data can be accelerated and the operating speed of printing control for the printer can be improved by correcting and storing the dot distribution table once.

For generating error information, the standard recording rate table D21 shown in FIG. 17 is stored in advance in the HD of the PC as a color correcting device, and the printer may be controlled to print on the printing medium a patch for correcting color of the standard recording rate by the type of dot by decreasing the dot recording amount of the patch for correcting color to be printed as the ink amount per dot increases by using the table D21. As shown in FIG. 9, as the maximum value of the selective color component variation VSi for a dot recording rate of a color is due to decreasing dot recording rate as the ink amount per dot increases. Incidentally, the standard recording rate table D21 is generated for each color and for each mode of setting (setting mode of the dot size), and FIG. 17 shows an example of the Y setting mode 1.

Figure 18:
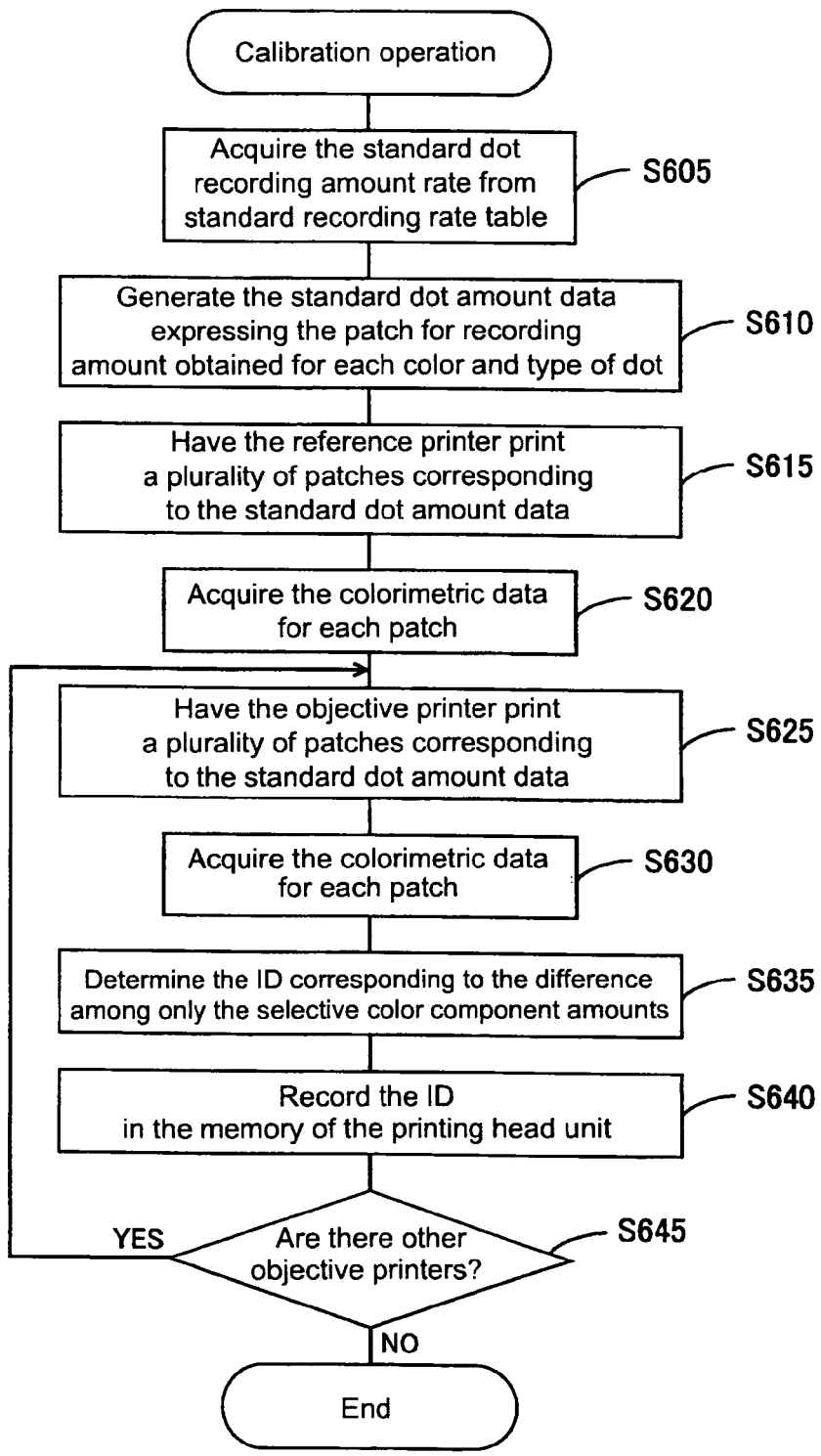
FIG. 18 is a flowchart showing calibration process in a variant.

FIG. 18 shows the calibration operation performed by the color correcting device used to execute a calibration operation by using the standard recording rate table.

According to the present variant, instead of carrying out the processing shown in FIG. 6, first of all, a standard dot recording rate SR for each color and for each type of dot is acquired from the standard recording rate table D21 stored in the HD to be stored temporarily in the RAM (S605). In other words, a standard dot recording rate SR that decreases as the ink amount per dot increases is specified as the standard dot recording amount for correcting printing data. Then, standard dot amount data 13d expressing a plurality of corresponding plain patches for correcting color are generated for each color and each type of dot from the dot recording amounts acquired in S605 to be stored temporarily in the RAM (S610). Thereafter, the reference printer is controlled to print a plurality of patches P4 for correcting reference color (S615) to acquire the colorimetric data of each patch P4 for correcting reference color (S620), and at the same time the objective printers are controlled to print a plurality of patches P3 for correcting color (S625) to acquire the calorimetric data of each patch P3 for correcting color (S630). The processing of S615 and S625 enables to control the printers to print on the printing medium patches for correction of color of the standard recording amount by each type of dot by reducing the dot recording amount of the patches for correcting color to be printed as the ink amount per dot increase. And the steps S625-S645 are repeated until the ID is recorded in the memory 31 of all the objective printers (S645) by calculating the ID value c·(SS−S0) corresponding to the difference of only selective color component amounts for each color and each type of dot (S635) and by recording the ID determined in the memory 31 of the objective printers (S640).

Then, the execution of the printing control operation shown in FIG. 12 leads to the correction of dot amount data (printing data) for each color of the ink and the type of dot so that the colors of the image for printing may be compensated and to the control of the objective printers to print the images for printing corresponding to the corrected printing data on the printing medium.

Incidentally, when the small dot is taken as the first dot of the present invention and at least one of the medium dot or the large dot is taken as the second dot of the present invention, the recording amount of dot of the patches for correcting colors printed by the second dot can be reduced in comparison with the dot recording amount of the patches for color correction printed by the first dot, and the printers will be controlled to print separate patches for color correction of the standard dot recording amount by the first and second dot on the printing medium. On the other hand, when the large dot is taken as the second dot, and at least one of the small dot and the medium lot is taken as the first dot, the same thing can be said.

As the dot recording amount with a large variation in the selective color component amount due to variations in the amount of ink adhering on the printing medium occurring for each printer decreases as the ink amount of dot increases, the execution of the operation described above can result in an improved color reproductiveness of the objective printers in relation to the reference colors.

(5) Second Embodiment

Figure 19:
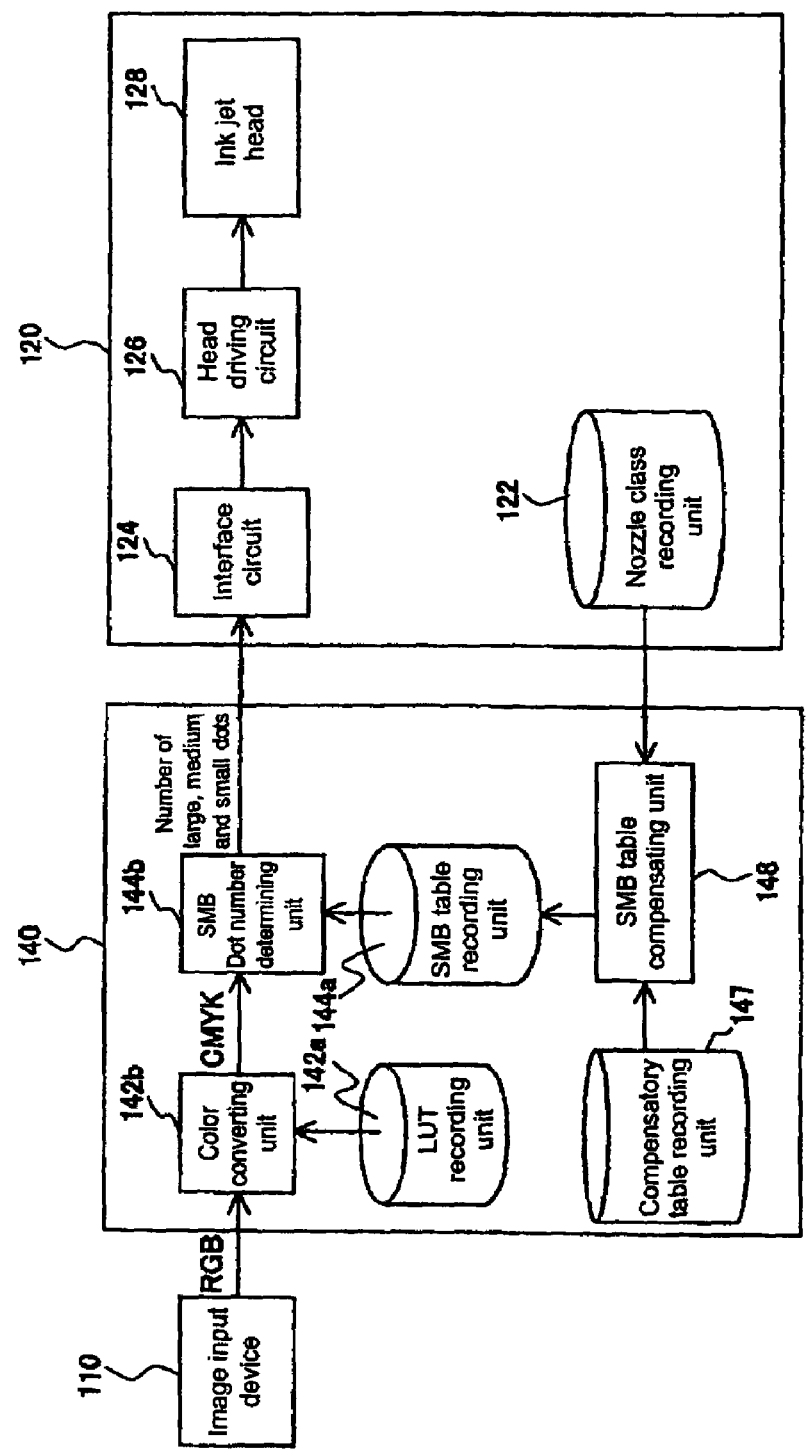
FIG. 19 is a block diagram showing the configuration of a printing system relating to the second embodiment.

FIG. 19 is a block diagram showing the printing system related to the second embodiment. The present printing system includes an image inputting device 110, an image processing device (printing control device) 140 and an image outputting device (printing unit) 120. The configuration to realize the present system may be a configuration similar to the one shown in FIG. 2. The image processing device (printing control device) 140 of the present embodiment should be realized in a printer driver or a computer. And the image outputting device 120 corresponds to a color printer (printing drive), and the image inputting device 110 corresponds to a scanner, a still camera or a video camera.

Figure 20:
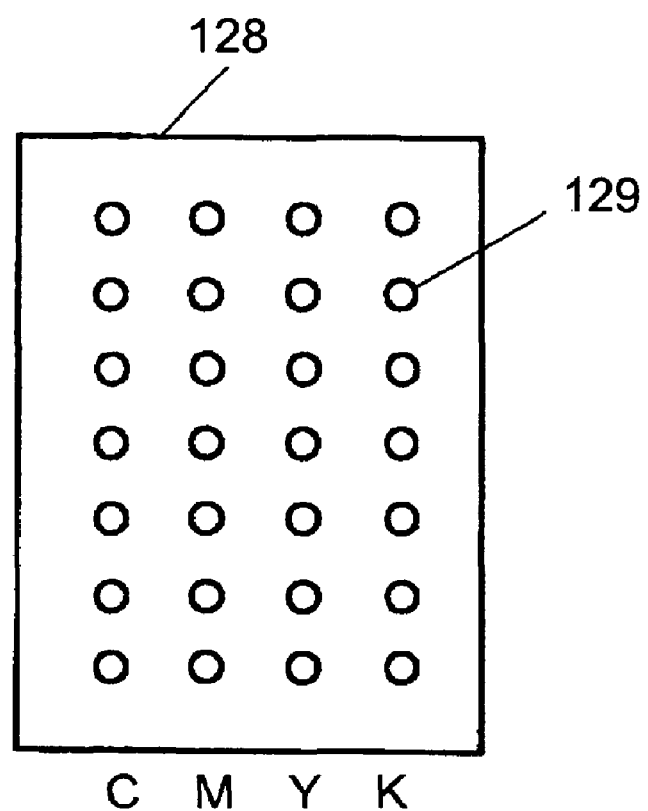
FIG. 20 is an illustration of an ink jet head.

The image outputting device 120 includes a nozzle class recording unit 122, an interface circuit 124, a head driving circuit 126, and an ink jet head 128. The image outputting device can form a N number (N is an integer of two or more) of types of dot of different sizes in an area of one picture element by adhering selectively a N number of ink drops of different ink amounts on a printing medium by using a plurality of types of ink. The interface circuit 124 constitutes an interface between the image processing device 140 and the head driving circuit 126. The head driving circuit 126 receives from the image processing device 140 through the interface circuit 124 voltage values to be impressed on the ink jet head 128 to impress the voltage to the ink jet head 128. The ink jet head 128 discharges ink according to the voltage impressed. The discharged ink adheres on paper and other media (printing medium) resulting in image being printed thereon. As shown in FIG. 20, the ink jet head 128 has ink nozzles 129 corresponding to each ink color (CMYK). The ink jet head 128 selectively discharges on the printing medium any one size (large, medium and small) of ink drops of a N number of types (N=3) of different ink amount by using a plurality of types of color (CNYK) by varying voltage to be applied on the printing head. This arrangement enables to form three types of dot of different sizes in an area of one picture element.

The nozzle class recording unit 122 records the nozzle class (corresponding to error information) relating to the ink nozzle 129 of the ink jet head 128. The nozzle class recording unit may be configured in such a way that a data-rewritable non-volatile semiconductor memory may store nozzle class information. The nozzle class (ink nozzle characteristics information) consists of values representing the difference between the reference ink weight discharged from reference ink nozzles serving as a reference and the ink weight discharged by an ink nozzle 129. Incidentally, the difference is indicated by percentage to the reference ink weight. For example, if the weight of ink discharged by the ink nozzle is equal to the reference weight of ink, the nozzle class=0. And if the weight of ink discharged by the ink nozzle is 10% greater than the weight of the reference ink, the nozzle class=+10. Moreover, if the weight of ink discharged by the ink nozzle is 10 less than the weight of the reference ink, the nozzle class=−10%. Or, the nozzle class may select a color component amount acquired by measuring the color in a color space of a patch for correcting color printed on the printing medium in a dot recording amount in the first embodiment mentioned above.

Incidentally, the nozzle class may be recorded in the image outputting device for all the types of dot including large dot, medium dot and small dot. Only any one type of the large dot, medium dot and small dot may be recorded in the image outputting device, and two types from among the large dot, medium dot and small dot may be recorded in the image outputting device. The type of dot recorded in the image outputting device here is the specified type of dot.

As described above, the image outputting device 120 is a device storing error information for each type of ink among a plurality of types of ink and for each type of dot among one or more types of dot from among a N number of types of dot. Here, the error information is a piece of information showing the results of comparing the calorimetric data obtained by measuring in a specific color space the color of a standard image of the standard recording amount printed by the image outputting device on the printing medium and the reference calorimetric data.

FIG. 21 shows an example of the nozzle class recorded in the nozzle class recording unit 122. For example, the ink color is C, and the nozzle class of the ink nozzle corresponding to the dot size large is +10 (10% greater than the reference ink weight). Essentially, the nozzle class should be uniform at zero. Due to manufacturing errors, however, the value deviates from zero and varies.

The image inputting device 110 gives RBG image data to the image processing device 140.

The image processing device 140 includes a LUT recording unit 142a, a color converting unit 142b, a SMB table recording unit 144a, a SMB dot number determining unit 144b, a compensation table recording unit 147, and a SMB table compensation unit 148.

The LUT recording unit 142a records a color converting table (LUT) for converting image date in RGB into CMYK image data. The color converting unit 142b converts image data in RBG received from the image inputting device 110 into image data in CMYK based on the color conversion table recorded in LUT recording unit 142a. In other words, it converts the color system (RGB) of the original image data received from the image inputting system 10 into the one shown by a plurality of color components (CMYK) that can be used by the image outputting device 120. The SMB table recording unit 144a records a SMB table (dot number table) for determining how many large, medium and small dot should be discharged relating to the picture element values of each color of ink of the image data in CMYK. Here, S, M, and B stand for small, middle and big. The SMB table records the relationship of correspondence between the gradation value of image data in CMYK inputted and the combination of the respective recording rate of each of N=3 types of dot (big, middle and small) outputted.

The SMB dot number determining unit (the half-tone unit) 144b determines how many small, middle and big dots should be discharged relating to the picture element values of image data in CMYK that had been received from the color converting unit 142b based on the SMB table recorded in the SMB table recording unit 144a. As described below, the SMB table is compensated by the SMB table compensating unit 148 in such a way that the error information (nozzle class) may be reflected therein. Based on this compensated SMB table, the SMB dot number determining unit 144b converts the gradation value of image data in CMYK into any one of N+1=4 gradation values ("no dot formed"), ("small dots formed"), ("medium dots formed") and ("big dots formed") by each picture element.

The color converting unit 142b and the SMB dot number determining unit 144b generates dot data (printing data) expressing the state of dots formed of each picture element in the image to be printed by processing the original image data received from the image inputting device 110.

The compensating table recording unit (compensating dot number recording unit) 147 record the number of dots that brings the color value (calorimetric data) of each dot for the ink nozzle corresponding to any nozzle class for each nozzle class (error information) to more or less the same value. Incidentally, the color value takes form of, for example, coordinate values in the color space Lab (uniform color space).

FIG. 22-FIG. 24 show examples of dot number data tables 147s, 147m and 147b recorded in the compensating table recording unit 147. The small dot table 147s stores dot numbers that bring color values arranged in a vertical file in the column "number of small dots" to almost the same values in color values. In the example of FIG. 22, the color value shown when a nozzle of the nozzle class=0 (reference ink nozzle) discharges 64 small dots is approximately the same as the color value acquired when a nozzle of the nozzle class=−10 discharges 66 small dots. The expression "approximately the same" means that color value drift$\Delta E$ is the minimum. In other words, it means that the color value drift$\Delta E$ between the time when a nozzle of the nozzle class=0 discharges 64 small dots and the color value at a time when a nozzle of the nozzle class=−10 discharges a n number (n=1-255) of small dots is the minimum at n=66.

Here, $\Delta E$ represents a color drift in the color space Lab, and $\Delta E=\{(L-L')^2+(a-a')^2+(b-b')^2\}^{1/2}$. However, (L, a, b) is the coordinate in the color space Lab of dots discharged by the nozzle of a nozzle class=0, and the coordinate value of this coordinate is the reference calorimetric data in the present invention. And (L', a', b') is the coordinate in the color space Lab of dots discharged by nozzles of a nozzle class other than that of 0, and the coordinate value L', a', b' of this coordinate is the calorimetric data of standard image printed on the printing medium by the object image outputting device used to print actually images.

If the intention is only to match the ink weight, it is enough to have the nozzle of a nozzle class=−10 discharge 64/(1−0.1)=71 small dots. This arrangement, however, results in color value drift becoming larger than the case of discharging 66 small dots.

A middle dot table 147m stores dot numbers arranged in a vertical file in the "middle dot number" column that bring color values to approximately the same value. In the example of FIG. 23, the color value shown when the nozzle of a nozzle class=0 discharges 64 middle dots is approximately the same as the color value acquired when the nozzle of a nozzle class=−10 discharges 67 middle dots.

A big dot table 147b stores dot numbers arranged in a vertical file in the "big dot number" column that bring color values to approximately the same value. In the example of FIG. 24, the color value shown when the nozzle of a nozzle class=0 discharges 64 big dots is approximately the same as the color value acquired when the nozzle of a nozzle class=−10 discharges 69 big dots.

Figure 25:
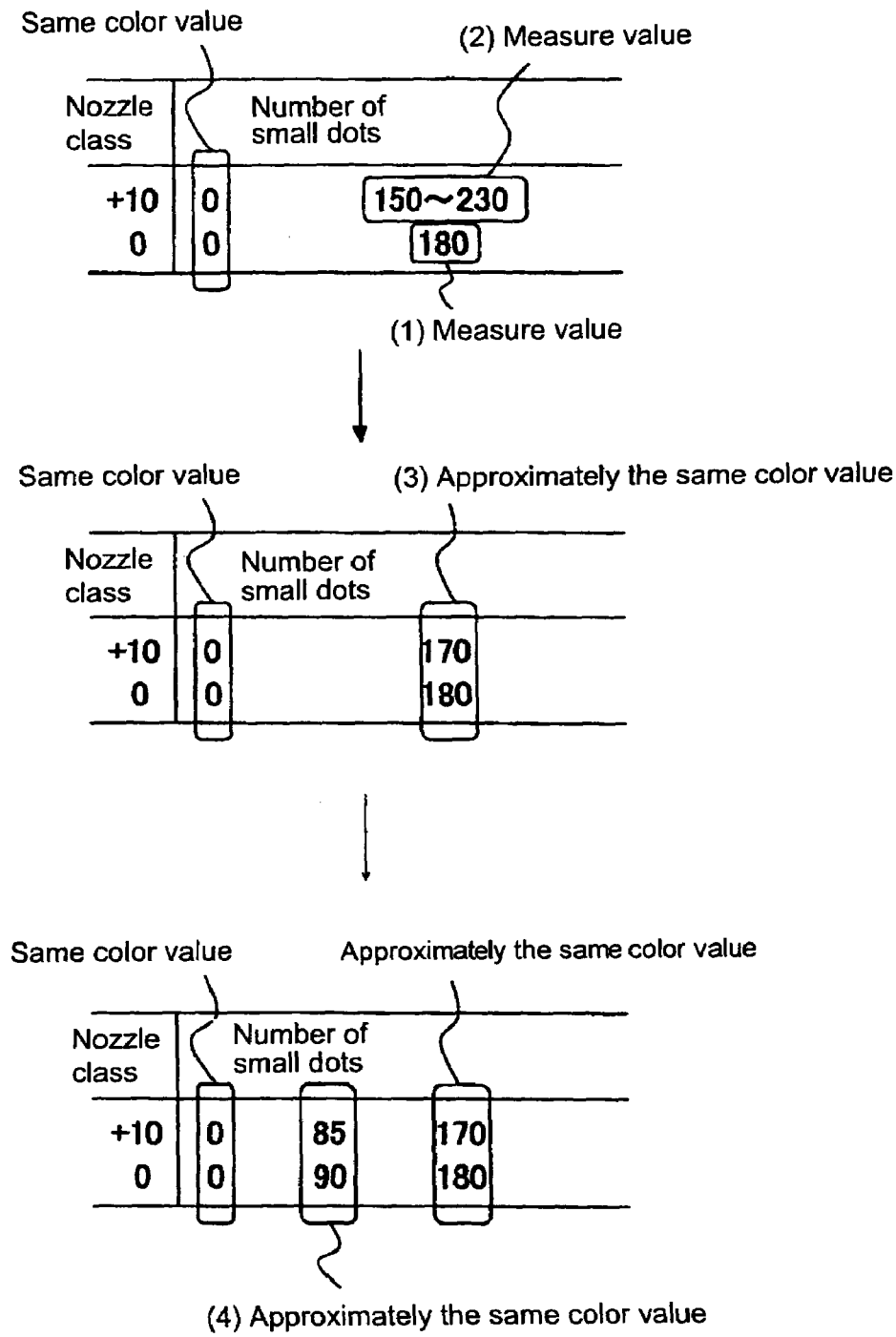
FIG. 25 is an illustration showing the process of acquiring a small dot table.

Here, the method of acquiring a small dot table 147s will be described with reference to FIG. 25. In the first place, (1) the nozzle of a nozzle class=0 is made to discharge a specified number (for example 180) of small dots to measure their color value. Then, (2) the nozzle of a nozzle class=−10 is made to discharge a specified range of number (for example 150-230) of small dots to measure their color value. Incidentally, even if the nozzle class is different, when the number of dots discharged is nil (nothing printed), color value remains the same.

Here, (3) the value of n resulting in the drift $\Delta E$ between the color value at the time when 180 small dots are discharged from the nozzle of a nozzle value=0 and the color value at the time when a n number (n=150-230) of small dots are discharged from the nozzle of a nozzle class=+10 being the minimum will be acquired from the results of measuring color in (1) and (2). For example, let us suppose that it is the minimum when n=170.

And, (4) other dot number will be acquired from the result of (3). For example, the value of n resulting in the drift $\Delta E$ between the color value at the time when 90 (=180/2) small dots are discharged from the nozzle of a nozzle value=0 and the color value at the time when a n number (n=1-225) of small dots are discharged from the nozzle of a nozzle class=+10 being the minimum will be the minimum when n=85 (=170/2).

The repetition of the operations described above for each nozzle class, each color and each dot size will result in the acquisition of the data tables 147s, 147m and 147b.

From the findings mentioned above, in the present embodiment, the colorimetric data of standard images printed on the printing medium by the objective image outputting device actually charged to print images and the colorimetric data (reference calorimetric data) of standard images printed on the printing medium by the reference image outputting device will be the coordinate values acquired by measuring in the uniform color space the color of standard image printed on the printing medium. And the compensating table recording unit records the number of ink dots adhering on the printing medium when the reference calorimetric data are acquired by measuring color in the uniform color space for each type of ink and for each type of dot and the number of ink dots adhering on the printing medium when the colorimetric data corresponding to the point having the minimum distance to the point for which the coordinate value of the reference calorimetric data is its coordinate from among a plurality of points for which the coordinate value of colorimetric data in the uniform color space is its coordinate are acquired, both number of ink dots corresponding to each other.

The SMB table compensating unit 148 corrects the SMB tables based on the nozzle class of the ink nozzle 129 and the contents recorded in the compensating table recording unit 147. Incidentally, the SMB table compensating unit 148 corresponds to the error information receiving unit for receiving the nozzle class from the nozzle class recording unit 122.

The compensating method by the SMB table compensating unit 148 will be described with reference to FIG. 26. The upper row of the figure shows the SMB table before compensation by the SMB table compensating unit 148. The horizontal axis represents the picture element value of image data in CMYK and the vertical axis represents the number of dots. This corresponds to the reference relationship of correspondence between the gradation value of image data in CMYK prepared in advance by assuming that color value is free of errors and the respective recording rate of the combination of N=3 types of dot (big, middle and small). According to the examples shown in the upper row of FIG. 26, the picture element value of 64 small dots, middle dots and big dots is respectively Is, Im and Ib.

Figure 26:
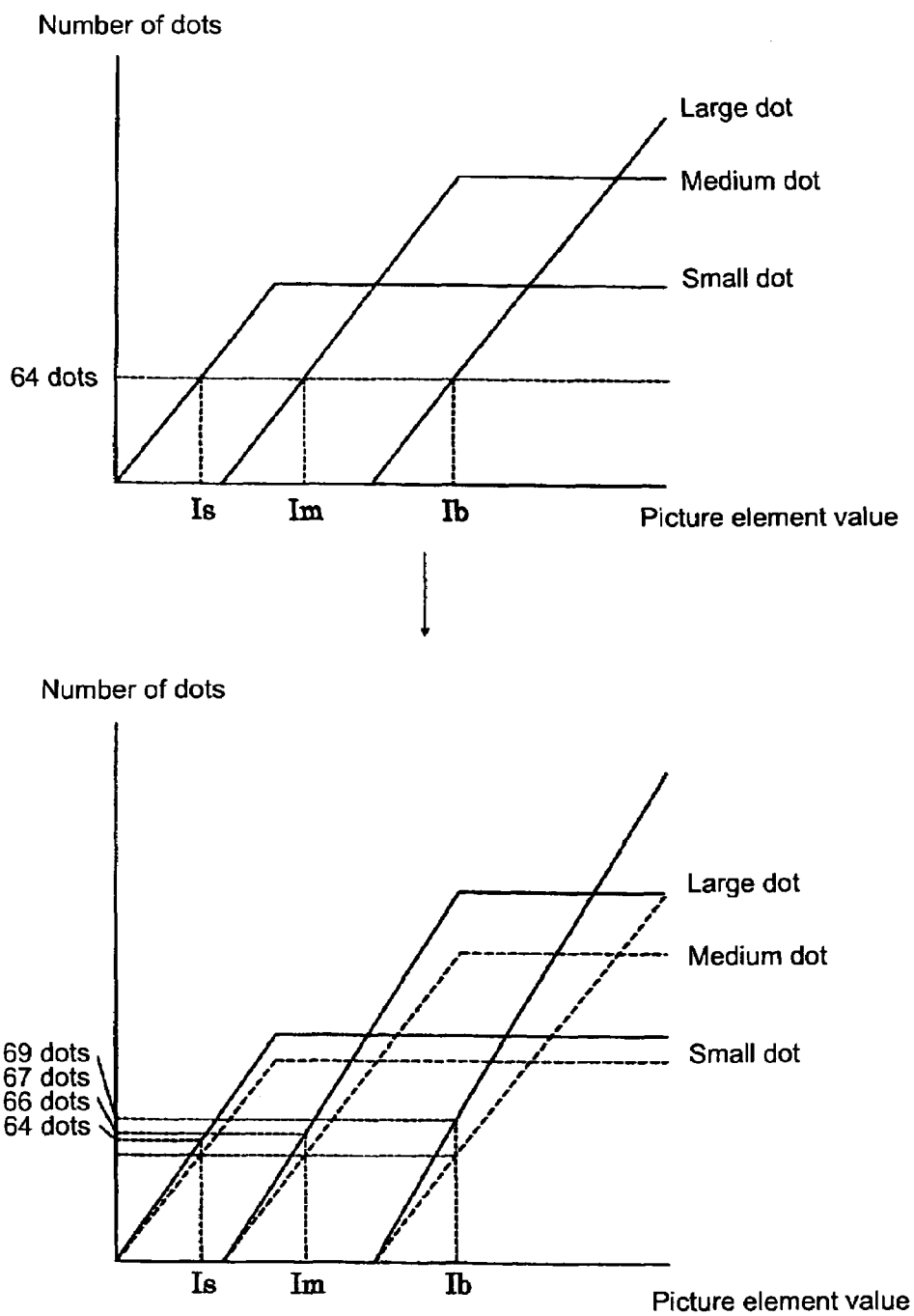
FIG. 26 is an illustration for describing the compensating method by the SMB table compensating unit.

When the nozzle class of the ink nozzle 129 is −10, the lower row of FIG. 26 shows the SMB table before (dotted line) and after (solid line) the compensation by the SMB table compensating unit 148. The SMB table after the compensation (solid line) corresponds to the compensated relationship of correspondence generated according to the reference relationship of correspondence and the error information (nozzle class).

According to the example of FIG. 22, the color value at the time when the nozzle of a nozzle class=0 discharges 64 small dots is approximately equal to the color value at the time when the nozzle of a nozzle class=−10 discharges 66 small dots. Therefore, in the case of the picture element value being Is, the compensating unit compensates in such a way that the ink nozzle 129 discharges 66 small dots.

In the example of FIG. 23, in the case of the picture element value being Im, the compensating unit compensates in such a way that the ink nozzle 129 discharges 67 middle dots.

In the example of FIG. 24, in the case of the picture element value being Ib, the compensating unit compensates in such a way that the ink nozzle 129 discharges 69 big dots.

In the meanwhile, the situation is similar when the nozzle of nozzle class=0 discharges another number of small, middle and big dots.

Then, the operation of the second embodiment will be described.

Before the image inputting device 110 gives RGB image data to the image processing unit 140, the SMB table compensating unit 148 compensates in advance the SMB table recorded in the SMB table recording unit 144a. Thereafter, RGB image data are given by the image inputting unit 110 to the image processing unit 140. RGB image data are given to the color converting unit 142b. Based on the color converting table recorded in the LUT recording unit 142a, the color converting unit 142b converts the RGB image data received from the image inputting device 110 into CMYK image data. The CMYK image data are given to the SMB dot number determining unit 144b. The SMB dot number determining unit 144b determines how many small, middle and big dots will be discharged with regards to the picture elements value of the CMYK image data received from the color converting unit 142b based on the SMB table recorded in the SMB table recording unit 144a.

The determination of the SMB dot number determining unit 144b is given to the image outputting unit 120. The determination is given to the head driving circuit 126 through the interface circuit 124. The head driving circuit 126 impresses voltage corresponding to the determination of the SMB dot number determining unit 144b to the ink jet head 128. The ink jet head 128 discharges ink in response to the voltage impressed. The discharged ink adheres on paper and other media to print.

Here, due to the manufacturing error or the like of the ink jet head 128, the weight of ink discharged by the ink nozzle 129 of the head fluctuates. For this reason, when the image output device 120 is charged to print based on the determination of the SMB dot number determining unit 144b, color value deviates from its proper value. However, the SMB table has been compensated by the SMB table compensating unit 148. By this compensation, the SMB dot number determining unit 144b generates dot data of which errors in color value have been compensated for each plurality of ink colors and for each specified type of dot depending on nozzle class and the contents recorded in the compensating table recording unit 147. As a result, the color value of image printed by the image outputting device 120 returns to its proper value. In other words, variations in the discharge characteristics of each ink nozzle 129 can be compensated.

According to the second embodiment, variations in the discharge characteristics of each ink nozzle 129 can be compensated by compensating the SMB table recorded in the SMB table recording unit 144a by the SMB table compensating unit 148, and the color value of dots acquired from each ink nozzle 129 can be corrected to coincide with the standard value.

As described above, according to the present invention, it will be possible to acquire a good color reproductiveness of image to be printed in relation to the reference color by various modes and means.

What is claimed is:

1. A printing control device for controlling a printing device to print on a printing medium a printing image corresponding to printing data by using a printing head for adhering ink on the printing medium, comprising:

an error acquiring unit for acquiring error information expressing a result of comparing a colorimetric data obtained by measuring a color of a standard image of a standard recording amount in the ink printed on the printing medium in a specified color space with a reference colorimetric data;

a printing control unit for correcting, by using the error information, printing data expressing an image into printing data compensating for a color drift of the image to be printed by the printing device, and controlling the printing device to print a printing image corresponding to the corrected printing data; and a storage area for storing a plurality of color correcting data specifying a relationship of correspondence between printing data before the correction and corrected printing data for compensating the color drift in the printing image for every plurality of stages of comparison results between the colorimetric data obtained by measuring the color of the standard images in the specified color space and the reference colorimetric data, wherein the printing control unit specifies the color correcting data corresponding to the error information among a plurality of color correcting data stored in the storage area, and corrects the printing data by referring the color correcting data.

2. The printing control device according to claim 1, wherein the printing control unit corrects the printing data expressing the image by using the error information to make printing data for compensating for the errors of the colorimetric data of the standard image printed by the printing device in relation to the reference colorimetric data.

3. A printing control device for controlling a printing device to print on a printing medium a printing image corresponding to printing data by using a printing head for adhering ink on the printing medium, comprising:

an error acquiring unit for acquiring error information expressing a result of comparing a colorimetric data obtained by measuring a color of a standard image of a standard recording amount in the ink printed on the printing medium in a specified color space with a reference colorimetric data; and a printing control unit for correcting, by using the error information, printing data expressing an image into printing data compensating for a color drift of the image to be printed by the printing device, and controlling the printing device to print a printing image corresponding to the corrected printing data, wherein the specified color space is defined as a color space consisting of a plurality of color components as their color component amounts, error information expresses a result of comparing only the color component amounts with the maximum variation in relation with the recording amount of ink among a plurality of color component amounts when the colorimetric data obtained by measuring the color of the standard image in the specified color space and the reference colorimetric data are to be compared, and the printing control unit corrects printing data expressing an image to the printing data in such a way that an error of the standard image printed by the printing device in the color component amount with the maximum variation in relation to the reference colorimetric data is compensated by using the error information.

4. The printing control device according to claim 3, wherein when (i) a reference printing device serving as a reference is used to print images for selecting color component according to a first printing amount and a second printing amount mutually different by the ink on the printing medium, (ii) each color of the printed image for selecting color component is measured in the specified color space to obtain colorimetric data consisting of a plurality of color component amounts for both images for selecting color components, (iii) the difference of color component amounts for both images for selecting color component for each color component in the specified color space is calculated, and (iv) the selected color component amount of the color component with a maximum difference is specified, the error information expresses the comparison result obtained by comparing only the selected color component amounts when the colorimetric data obtained by measuring the colors of the standard images in the specified color space and the reference colorimetric data are compared, the printing control unit corrects printing data expressing images to the printing data in such a way that an error in the reference colorimetric data in the selective color component amount of the standard image printed by the printing device is compensated.

5. The printing control device according to claim 3, wherein the printing control unit corrects the printing data expressing the image by using the error information to make printing data for compensating for the errors of the colorimetric data of the standard image printed by the printing device in relation to the reference colorimetric data.

6. A printing control device for controlling a printing device to print on a printing medium a printing image corresponding to printing data by using a printing head for adhering ink on the printing medium, comprising:

an error acquiring unit for acquiring error information expressing a result of comparing a colorimetric data obtained by measuring a color of a standard image of a standard recording amount in the ink printed on the printing medium in a specified color space with a reference colorimetric data; and a printing control unit for correcting, by using the error information, printing data expressing an image into printing data compensating for a color drift of the image to be printed by the printing device, and controlling the printing device to print a printing image corresponding to the corrected printing data, wherein when the ink recording amount a the maximum variation in colorimetric data due to variations in the amount of ink adhering on the printing medium for the ink, the variations occurring for each printing device, is chosen as the standard recording amount for printing the standard images by the printing device on the printing medium, and the error information expresses a result of comparing the colorimetric data obtained by measuring the color the standard images printed by the printing device on the printing medium and the reference colorimetric data, the printing control unit corrects the printing data in such a way that an error in the colorimetric data of the standard images of the ink recording amount with the maximum variation printed by the printing device in relation with the reference colorimetric data is compensated.

7. The printing control device according to claim 6 wherein:

when (i) a first printing device and a second printing device requiring a larger amount of ink adhering on the printing medium than the first printing device are controlled to print a plurality of images for determining recording amount of which the recording amount of the ink has been changed on the printing medium, (ii) the color of each image for determining the recording amounts printed by the first printing device is measured in the specified color space to thereby acquire a first colorimetric data for each the image for determining the recording amount, (iii) the color of each image for determining recording amounts printed by the second printing device is measured in the specified color space to thereby acquire a second colorimetric data for each image for determining the recording amounts, and (iv) the ink recording amount having a maximum variation in colorimetric data due to variations in the amount of ink adhering on the printing medium, the variations occurring for each the printing device, has been determined as the standard recording amount from the amount of ink with which the same plurality of images for determining the recording amount as the first and second selective color component amounts have been printed, the error information expresses the results of comparing the colorimetric data acquired by measuring in the specified color space the color of standard image of the standard ink recording amount and the reference colorimetric data; and the printing control unit uses the error information to correct the printing data expressing the image and to make printing data for compensating the error in the colorimetric data of standard image of the standard ink recording amount determined and printed on the printing medium in relation to the reference colorimetric data out of the same.

8. The printing control device according to claim 6, wherein the printing control unit corrects the printing data expressing the image by using the error information to make printing data for compensating for the errors of the colorimetric data of the standard image printed by the printing device in relation to the reference colorimetric data.

9. A printing control device for controlling a printing device to print on a printing medium a printing image corresponding to printing data by using a printing head for adhering ink on the printing medium, comprising:

an error acquiring unit for acquiring error information expressing a result of comparing a colorimetric data obtained by measuring a color of a standard image of a standard recording amount in the ink printed on the printing medium in a specified color space with a reference colorimetric data; and a printing control unit for correcting, by using the error information, printing data expressing an image into printing data compensating for a color drift of the image to be printed by the printing device, and controlling the printing device to print a printing image corresponding to the corrected printing data, wherein the printing device is a device capable of adhering at least a first dot and a second dot requiring a larger amount of ink than the first dot from the printing head on the printing medium;

the error information is a piece of information provided for each type of the dot and expressing the results of comparing the colorimetric data obtained by measuring in the specified color space the color of standard image by the type of the dot printed by the printing device on the printing medium by decreasing the recording amount of dots of standard image printed by the second dot than the recording amount of dots of standard image printed by the first dot in the ink; and the printing control unit corrects the printing data expressing the image and makes printing data for compensating color drifts of image to be printed by the printing device from the printing data expressing the image out of the same by using the corresponding error information for each type of the dot.

10. A printing control device for controlling a printing device to print on a printing medium a printing image corresponding to printing data by using a printing head for adhering ink on the printing medium, comprising:

an error acquiring unit for acquiring error information expressing a result of comparing a colorimetric data obtained by measuring a color of a standard image of a standard recording amount in the ink printed on the printing medium in a specified color space with a reference colorimetric data; and a printing control unit for correcting, by using this error information, printing data expressing an image into printing data compensating for a color drift of the image to be printed by the printing device, and controlling the printing device to print a printing image corresponding to the corrected printing data, wherein the printing device is a device capable of adhering on the printing medium a specified number of types of dots of different ink amount from the printing head on the printing medium;

the error information is provided for each type of the dot, and expresses the results of comparing the colorimetric data obtained by measuring in the specified color space the color of standard image by the type of dot printed by the printing device on the printing medium and the reference colorimetric data; and the printing control unit corrects the printing data expressing the image and makes printing data for compensating color drifts of image to be printed by the printing device from the printing data expressing the image out of the same by using the corresponding error information for each type of the dot.

11. A printing control device for controlling a printing device to print on a printing medium a printing image corresponding to printing data by using a printing head for adhering ink on the printing medium, comprising:

an error acquiring unit for acquiring error information expressing a result of comparing a colorimetric data obtained by measuring a color of a standard image of a standard recording amount in the ink printed on the printing medium in a specified color space with a reference colorimetric data; and a printing control unit for correcting, by using this error information, printing data expressing an image into printing data compensating for a color drift of the image to be printed by the printing device, and controlling the printing device to print a printing image corresponding to the corrected printing data, wherein the printing head is provided for every plurality of types of ink and the printing device is a device for printing the image for printing on the printing medium by using the corresponding printing head for each type of ink, the error information is provided for each type of the ink, and the printing control unit corrects the printing data expressing the image and makes printing data for compensating color drifts of image to be printed by the printing device from the printing data expressing the image out of the same by using the corresponding error information for each type of the dot.

12. A printing control device for controlling a printing device to print on a printing medium a printing image corresponding to printing data by using a printing head for adhering ink on the printing medium, comprising:

an error acquiring unit for acquiring error information expressing a result of comparing a colorimetric data obtained by measuring a color of a standard image of a standard recording amount in the ink printed on the printing medium in a specified color space with a reference colorimetric data; and a printing control unit for correcting, by using this error information, printing data expressing an image into printing data compensating for a color drift of the image to be printed by the printing device, and controlling the printing device to print a printing image corresponding to the corrected printing data, wherein the printing device can form N number of types of dots of different sizes in an area of one picture element by discharging selectively N number (N is an integer of two or more) of types of ink drops of different ink amount on the printing medium by using a plurality of types of ink and is a device for storing the error information for each type of ink in the plurality of types of ink and for each type of dot in at least one or more types of dots from among the N number of types of dots, and the printing control unit receives the error information from the printing device.

13. The printing control device according to claim 12, wherein:

the printing data are dot data expressing the state of dots formed of each picture element in image for printing; and the printing control unit generates the dot data by processing the given original image data and generates the dot data wherein errors of the colorimetric data are compensated according to the error information for each type of ink in the plurality of types of ink and for each type of dot in at least one or more types of dots from among the N number of types of dots.

14. The printing control device according to claim 13, further comprising a color converting unit for generating color converted image data expressed in a plurality of color components that the printing device can use by converting the color indicating system of the original image data by using a color converting table; and a half-tone unit for converting a gradation value of the color converted image data for each picture element into any of N+1 number of gradations values based on a relationship of correspondence between the gradation value of the color converted image data inputted and a combination of recording rates for each type of dot outputted the relationship of correspondence having been compensated based on the error information, wherein the half-tone unit generates the compensated relationship of correspondence based on the reference relationship of correspondence between the gradation values of the color converted image data and the combination of recording rates for each type of the dot, and on the error information.

15. The printing control device according to claim 12 further comprising a compensating dot number recording unit for recording the number of dots that adjusts colorimetric data for each type of the ink and for each type of the dot, wherein the printing control unit generates the dot data of which errors in the colorimetric data are compensated for each type of the ink and for each type of the dot in response to the error information and the contents recorded in the compensating dot number recording unit.

16. The printing control device according to claim 15 wherein:

the colorimetric data and the reference colorimetric data constitute coordinates obtained by measuring in the uniform color space the color of the standard image printed on the printing medium; and the compensating dot number recording unit records the number of ink dots adhering on the printing medium when the reference colorimetric data are obtained by measuring in the uniform color space the color of the standard image for each type of the ink and for each type of the dot and the number of ink dot adhering on the printing medium when the colorimetric data corresponding to the point having the minimum distance to the point having the coordinate value of the reference colorimetric data as its coordinate among a plurality of points having the coordinate value of the colorimetric data in the uniform color space as their coordinates are obtained, both dot numbers corresponding each other.

17. A printing control method for controlling a printing device to print on a printing medium a printing image corresponding to printing data by using a printing head for adhering ink on the printing medium, comprising:

acquiring error information expressing a result of comparing a colorimetric data obtained by measuring a color of a standard image of a standard recording amount in the ink printed on the printing medium in a specified color space with a reference colorimetric data;

specifying color correcting data corresponding to the error information among a plurality of color correcting data stored in a storage area for storing a plurality of color correcting data specifying a relationship of correspondence between printing data before the correction and corrected printing data for compensating for a color drift in the printing image for every plurality of stages of comparison results between the colorimetric data obtained by measuring the color of the standard images in the specified color space and the reference colorimetric data;

correcting printing data expressing an image into printing data compensating for a color drift of the image to be printed by the printing device by referring to the color correcting data; and controlling the printing device to print a printing image corresponding to the corrected printing data.

18. A medium for recording a printing control program for enabling a computer to execute the function of controlling a printing device to print on a printing medium a printing image corresponding to printing data by using a printing head for adhering ink on the printing medium, the medium recording the color control program for enabling the computer to execute the functions of:

acquiring error information expressing a result of comparing a colorimetric data obtained by measuring a color of a standard image of a standard recording amount in the ink printed on the printing medium in a specified color space with a reference colorimetric data;

specifying color correcting data corresponding to the error information among a plurality of color correcting data stored in a storage area for storing a plurality of color correcting data specifying a relationship of correspondence between printing data before the correction and corrected printing data for compensating the color drift in the printing image for every plurality of stages of comparison results between the colorimetric data obtained by measuring the color of the standard images in the specified color space and the reference colorimetric data;

correcting printing data expressing an image into printing data compensating for a color drift of the image to be printed by the printing device by referring to the color correcting data; and controlling the printing device to print a printing image corresponding to the corrected printing data.

* * * * *